United States Patent [19]

Tahara

[11] Patent Number: 5,473,380
[45] Date of Patent: Dec. 5, 1995

[54] PICTURE SIGNAL TRANSMITTING METHOD AND APPARATUS

[75] Inventor: Katsumi Tahara, Kanagawa, Japan

[73] Assignee: Sony Corporation, Tokyo, Japan

[21] Appl. No.: 219,472

[22] Filed: Mar. 29, 1994

[30] Foreign Application Priority Data

Mar. 29, 1993 [JP] Japan .................................. 5-069829

[51] Int. Cl.$^6$ .................................. H04N 7/50
[52] U.S. Cl. ........................... 348/423; 358/335; 358/339
[58] Field of Search ..................... 348/423, 402, 348/416; 370/110.1; 358/335, 339; H04N 7/133, 7/137

[56] References Cited

U.S. PATENT DOCUMENTS

5,148,272  9/1992  Acampora ........................ 370/110.1
5,260,783  11/1993  Dixit ...................................... 348/401

FOREIGN PATENT DOCUMENTS

0349847  1/1990  European Pat. Off. .

OTHER PUBLICATIONS

AT&T Technical Journal, vol. 72, No. 1, Feb. 1993, New York, pp. 67–89, Aravind et al., "Image and Video Coding Standards".

*Primary Examiner*—Howard W. Britton
*Attorney, Agent, or Firm*—William S. Frommer; Alvin Sinderbrand

[57] ABSTRACT

A picture type identifier, indicating one of intra-picture coding (an I-picture), forward or backward predictive coding (a P-picture) and bi-directionally predictive coding (a B-picture), is included with a picture signal when the signal is encoded and when the signal is decoded. Each of initial and subsequent encoding and decoding is a function of the included picture type.

20 Claims, 18 Drawing Sheets

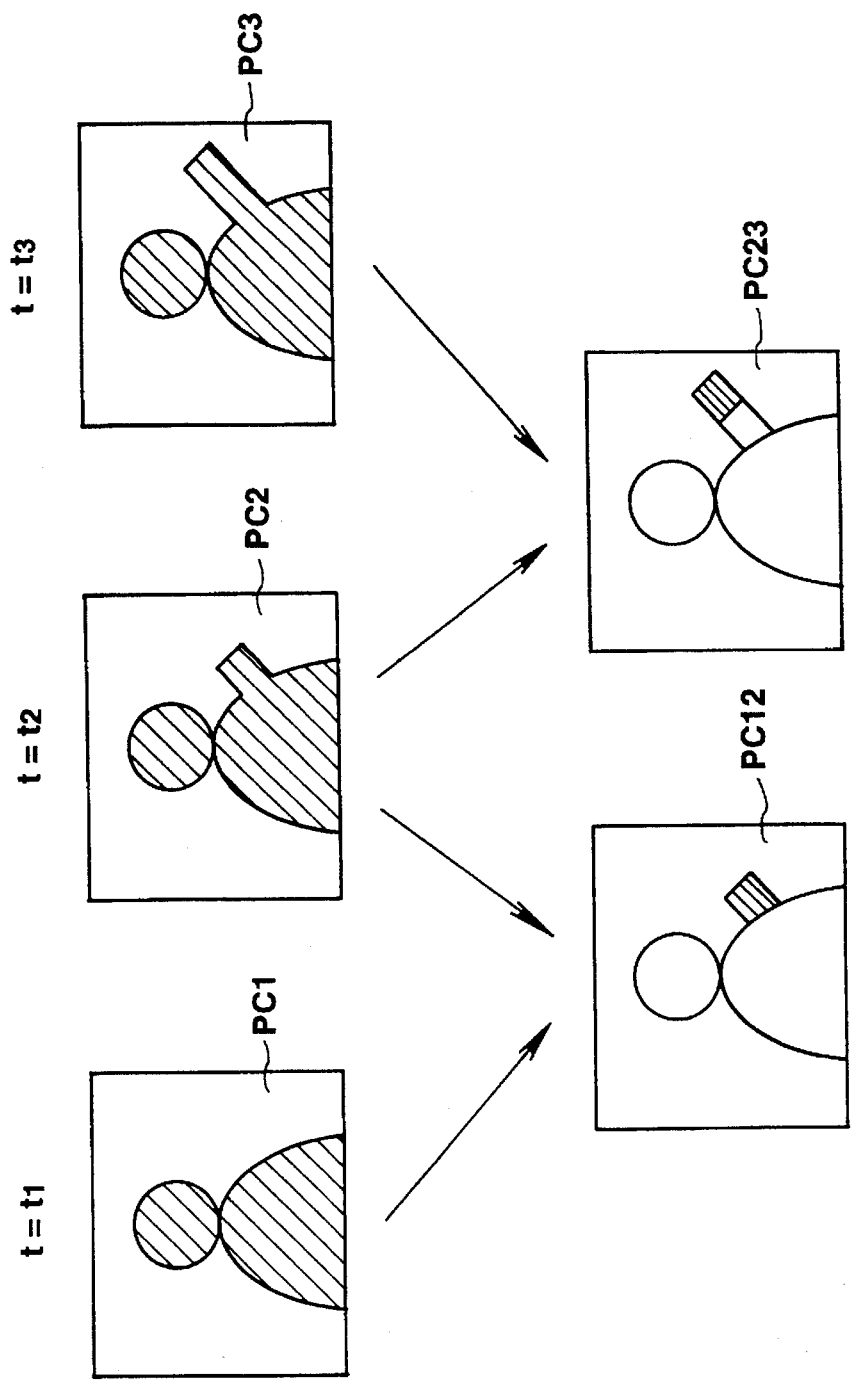

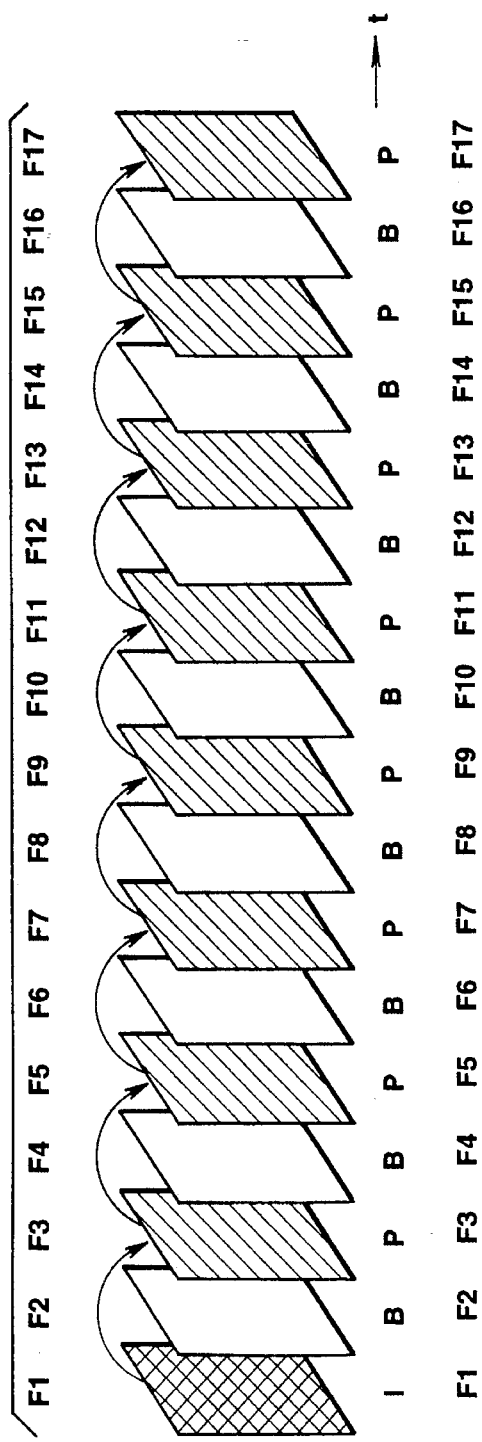
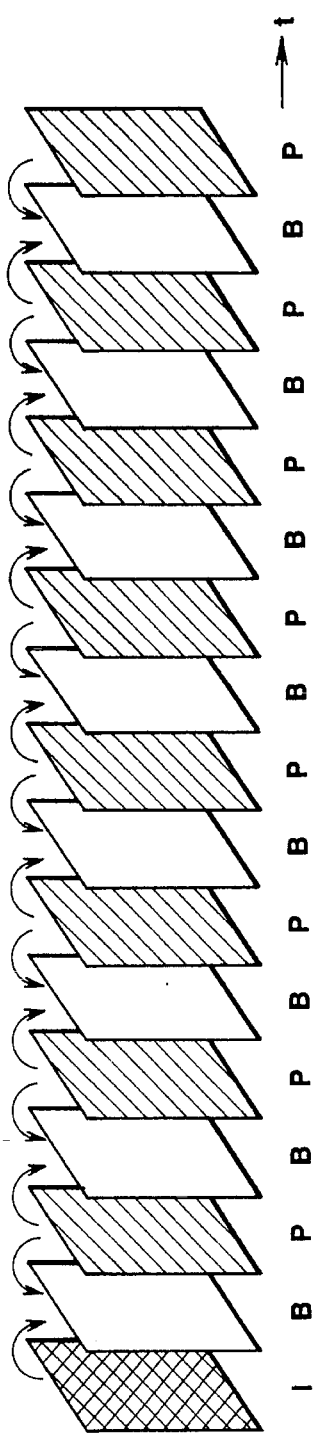
FIG.2A
FIG.2B

PICTURE SIGNAL TRANSMITTING METHOD AND APPARATUS

BACKGROUND OF THE INVENTION

The present invention relates to coding and decoding of a picture signal for transmission, and, more particularly, is directed to matching the type of predictive coding applied to pictures of the picture signal.

In, for example, a teleconferencing system or a video telephone system, moving picture signals are compressed and encoded by taking advantage of intra-frame and inter-frame correlation so that they can be more efficiently transmitted over a communication channel to a remote location.

Intra-frame correlation can be utilized by an orthogonal transformation, such as a discrete cosine transformation (DCT).

Inter-frame correlation can be utilized by predictive encoding between successive pictures. As used herein, a picture generally refers to an image represented by a frame. When the fields of a frame are coded in a non-interlaced manner, that is, separately, each field may be referred to as a picture.

As shown in FIG. 1A, for example, frame pictures PC1, PC2 and PC3 are generated at time points t1, t2 and t3. As shown by shading in FIG. 1B, the difference between the frame pictures PC1 and PC2 is obtained as difference picture data PC12, and the difference between the frame pictures PC2 and PC3 is obtained as difference picture data PC23. Since there is a fairly small change between signals of temporally neighboring frames, transmission of only the difference picture data utilizes the transmission channel more efficiently than transmission of the original pictures. That is, using the difference picture data as encoded picture signals reduces the amount of data to be transmitted.

However, if only the difference signals are transmitted, the original picture cannot be restored. It is advantageous to occasionally transmit a picture which is not predictively encoded as a reference for difference picture data, and because it is sometimes more efficient than transmitting the picture as a predictively encoded picture.

Pictures which are encoded utilizing only intra-frame correlation and not inter-frame correlation, are referred to herein as intra-pictures or I-pictures.

Pictures which are encoded with predictive encoding relative to one previously encoded picture are referred to herein as predictive pictures or P-pictures. The previously encoded picture may be an I-picture or a P-picture, and temporally succeeds the P-picture.

Pictures which are encoded with predictive encoding relative to at most two pictures, a temporally preceding and a temporally succeeding picture, are referred to herein as bi-directionally predictive coded pictures or B-pictures. The two pictures may each be an I-picture or a P-picture. When both are used, the mean value of the two pictures is obtained and used as a reference picture for the picture to be encoded.

A series of pictures may be considered as groups of pictures having a predetermined number of frames such as F1 ... F17. The luminance and chrominance picture signals of the leading frame F1 are encoded as an I-picture, the picture signals of the second frame F2 are encoded as a B-picture, and the picture signals of the third frame F3 are encoded as a P-picture. The fourth and the following frames F4 to F17 are encoded alternately as B-pictures and P-pictures. FIG. 2A shows the reference pictures used for encoding P-pictures, while FIG. 2B shows the reference pictures used for encoding B-pictures.

As shown in FIGS. 3A and 3B, there are four methods for encoding the macro-blocks (discussed below) of a picture. When multiple methods are suitable, the method which will give the smallest amount of encoded data is employed on a macro-block by macro-block basis. Blocks F1 to F5 in FIG. 3A represent data for frames of moving picture signals, whereas blocks F1X to F5X in FIG. 3B represent data for encoded frames. The solid line arrows in FIG. 3A show the frames to which motion vectors x1 ... x6 relate.

The first method, shown as SP1, is to not use predictive encoding, that is, to use only intra-frame correlation. This is suitable for any macro-blocks of an I-picture a P-picture and a B-picture. In other words, if less encoded data is produced without predictive encoding, then this method is selected.

The second method, shown as SP2, is to predictively encode relative to a picture which temporally succeeds the current picture, referred to as backward predictive encoding. The third method, shown as SP3, is to predictively encode relative to a picture which temporally precedes the current picture, referred to as forward predictive encoding. The second method is suitable for macro-blocks of only B-pictures. The third method is suitable for macro-blocks of P-pictures and B-pictures.

The fourth method, shown as SP4, is to predictively encode relative to the mean value of two pictures, one temporally preceding and one temporally succeeding the current picture. This method is suitable for macro-blocks of only B-pictures.

The encoding sequence will now be described.

The first frame F1 is encoded as an I-picture using the first method SP1 so that it is directly transmitted over a transmission channel as encoded data F1X.

The third frame F3 is encoded as a P-picture. When the third method SP3, forward predictive coding, is used for a macro-block, difference signals from the temporally preceding frame F1 used as the reference picture, as indicated by a broken-line arrow SP3, and a motion vector x3 between the reference picture F1 and the current picture F3, are calculated and encoded as data F3X for that macro-block. Alternatively, in this or another macro-block of the P picture, if a smaller amount of encoded data is produced for a macro-block of the P picture being encoded, the first method SP1 can be used wherein the data of the original frame F3 are directly utilized as the transmission data F3X for that macro-block.

The second frame F2 is encoded as a B-picture.

When the fourth method SP4 is used to encode a macro-block of the frame F2, a difference between the mean value of the temporally preceding frame F1 and the temporally succeeding frame F3 is calculated, on a pixel by pixel basis. The difference data and the motion vectors x1 and x2 are encoded as data F2X.

When the first processing method SP1 is used to encode a macro-block of the frame F2, the data of the original frame F2 forms the encoded data F2X.

When one of the second or third methods SP2, SP3 is used to encode a macro-block of the frame F2, one of the difference between the temporally succeeding frame F3 and the current frame F2, and the difference between the temporally preceding frame F1 and the current frame F2 is calculated. The difference data and one of the motion vectors x1, x2 are encoded as the data F2X.

The frame F4 for the B-picture and the frame F5 for the

P-picture are processed in a similar manner as described above to generate transmitted data F4X and F5X.

FIG. 4 illustrates an arrangement for encoding and decoding moving picture signals in accordance with the above-described predictive encoding scheme. As shown in FIG. 4, an encoding device 1 encodes input picture signals and transmits the encoded signals to a recording medium 3 as a transmission channel for recording. A decoding device 2 reproduces the signals recorded on the recording medium 3 and decodes these as output signals.

The encoding device 1 includes an input terminal 10, a pre-processing circuit 11, A/D converters 12 and 13, a frame memory 14 including a luminance signal frame memory 15 and a color difference signal frame memory 16, a format converting circuit 17 and an encoder 18.

Input terminal 10 is adapted to receive a video signal VD and to supply the signal VD to pre-processing circuit 11 which functions to separate the video signal VD into luminance signals and color signals, herein chrominance or color difference signals, that are applied to analog-to-digital (A/D) converters 12 and 13, respectively. The video signals, digitized by analog-to-digital conversion by the A/D converters 12 and 13, are supplied to frame memory 14 having memories 15, 16 which function to store the luminance signals and the color difference signals, respectively, and to read out the signals stored therein to format converting circuit 17.

The converter 17 is operative to convert frame format signals stored in the frame memory section 14 into block format signals. As shown in FIG. 5A, pictures are stored in the frame memory section 14 as frame-format data having V lines each consisting of H dots. The converting circuit 17 divides each frame into N slices, each slice comprising a multiple of 16 lines. As shown, in FIG. 5B, the converter 17 divides each slice into M macro-blocks. As shown in FIG. 5C, each macro-block represents luminance signals Y corresponding to 16×16 pixels or dots, and associated chrominance Cr, Cb signals. These luminance signals are subdivided into blocks Y1 to Y4, each consisting of 8×8 dots. The 16×16 dot luminance signals are associated with 8×8 dot Cb signals and 8×8 dot Cr signals. The converter 17 is also operative to supply the block format signals to the encoder 18, which is described in detail below with reference to FIG. 6.

The encoder 18 operates to encode the block format signals and to supply the encoded signals as a bitstream over a transmission channel for recording on the recording medium 3.

The decoding device 2 includes a decoder 31, a format converting circuit 32, a frame memory section 33 including a luminance signal frame memory 34 and a color difference signal frame memory 35, digital-to-analog converters 36 and 37, a post-processing circuit 38 and an output terminal 30.

The decoder 31 is operative to reproduce encoded data from the recording medium 3 and to decode the encoded data, as described in detail below with reference to FIG. 9, and to supply decoded data signals to format converting circuit 32 which is operative to convert the decoded data signals into frame format data signals and to supply the frame format data signals as luminance signals and color difference signals to the memory 33. The memories 34, 35 of the memory 33 function to store the luminance and chrominance signals, respectively, and to apply these signals to D/A converters 36 and 37, respectively. The analog signals from converters 36, 37 are synthesized by a post-processing circuit 38 which functions to form output picture signals and to output them to output terminal 30, and thence to a display unit, such as a CRT, not shown, for display.

FIG. 6 illustrates the encoder 18 shown in FIG. 4.

Generally, the encoder 18 stores three pictures, the current picture and the pictures temporally preceding and succeeding the current picture. Based on the sequential position of the current picture in the group of pictures, the picture coding type (I, P or B) is selected for each picture. The picture type sequence is determined by a user using picture type input device 65, independent of the pictures applied to an input terminal 49.

The encoder 18 also chooses one of frame-based and field-based predictive encoding as will be explained with reference to FIG. 7, and further chooses one of frame-based and field-based DCT encoding as will be explained with reference to FIG. 8. For each picture, appropriate motion vectors are obtained and the picture is predictively encoded relative to zero, one or two previously encoded pictures which have been locally decoded and which are referred to as reference pictures to form a difference data signal. The difference data signal is orthogonally transformed into blocks of coefficient data which are quantized, variable length encoded and transmitted as encoded data.

At the encoder 18, the quantized data are dequantized, inverse orthogonally transformed, and stored as the reference pictures. The predictive encoding applies the motion vector(s) obtained for the current picture to the reference picture(s) to produce a prediction picture which is subtracted from the current picture to yield the difference data.

The elements of the encoder 18 will now be explained in detail.

Picture data for encoding is supplied macro-block by macro-block to the input terminal 49 and thence to a motion vector detection circuit 50 which is operative to process the picture data of respective frames as I-pictures, P-pictures or as B-pictures, in accordance with a predetermined sequence for each group of pictures, as shown for example, in FIGS. 2A, 2B. The circuit 50 applies the picture data of the current frame to a frame memory 51 having frame memories 51a, 51b, 51c used for storing a temporally preceding picture, the current picture and a temporally succeeding picture, respectively.

More specifically, the frames F1, F2, F3 are stored in the memories 51a, 51b, 51c, respectively. Then the picture stored in memory 51c is transferred to memory 51a. The frames F4, F5 are stored in the memories 51b, 51c, respectively. The operations of transferring the picture in memory 51c to memory 51a and storing the next two pictures in memories 51b, 51c are repeated for the remaining pictures in the group of pictures.

After the pictures are read into the memory and temporarily stored, they are read out and supplied to a prediction mode changeover circuit 52 which is adapted to process the current picture for one of frame based and field based predictive encoding. After processing the first frame picture data in a group of pictures as an I-picture and before processing the second frame picture as a B-picture, the motion vector detection circuit 50 processes the third frame P-picture. The processing sequence is different from the sequence in which the pictures are supplied because the B-picture may involve backward prediction, so subsequent decoding may require that the P-picture temporally succeeding the B-picture have been previously decoded.

The motion vector detection circuit 50 calculates as an estimated value for intra-coding for each macro-block, the sum of absolute values of prediction errors for the frame prediction mode for each macro-block and the sum of absolute values of prediction errors for the field prediction mode for each macro-block and supplies these sums to the prediction decision circuit 54 which compares these sums and selects frame prediction mode or field prediction mode in accordance with the smallest of these values and provides the selected mode to the prediction mode changeover circuit 52.

If the frame prediction mode is selected, the prediction mode changeover circuit 52 outputs the four luminance blocks Y1 to Y4 and the two chrominance or color difference blocks Cb, Cr of each macro-block received from the motion vector detection circuit 50 without processing. As shown in FIG. 7A, odd or first field line data, indicated by solid lines, and even or second field line data, indicated by dashed lines, alternate in each luminance and color difference block as received from the motion vector detection circuit 50. In FIG. 7A, a indicates units for motion compensation. In the frame prediction mode, motion compensation is performed with four luminance blocks (macro-blocks) as a unit and a single motion vector is associated with the four luminance blocks Y1 to Y4.

If the field prediction mode is selected, the prediction mode changeover circuit 52 processes the signals received from the motion vector detection circuit 50 so that each of the four luminance blocks comprises data from a single field and the two color difference blocks have non-interlaced odd and even field data. Specifically, as shown in FIG. 7B, the luminance blocks Y1 and Y2 have odd-field data and the luminance blocks Y3 and Y4 have even-field data, while the upper halves of the color difference blocks Cb, Cr represent odd field color difference data for the luminance blocks Y1 and Y2 and the lower halves of the color difference blocks Cb, Cr represent even field color difference data for the luminance blocks Y3 and Y4. In FIG. 7B, b indicates units for motion compensation. In the field prediction mode, motion compensation is performed separately for the odd-field blocks and even-field blocks so that one motion vector is associated with the two luminance blocks Y1 and Y2 and another motion vector is associated with the two luminance blocks Y3 and Y4.

The prediction mode changeover circuit 52 supplies the current picture, as processed for frame based or field based predictive encoding, to arithmetic unit 53 of FIG. 6. The arithmetic unit 53 functions to perform one of intra-picture prediction, forward prediction, backward prediction or bi-directional prediction. A prediction decision circuit 54 is adapted to select the best type of prediction in dependence upon the prediction error signals associated with the current picture signals.

The motion vector detection circuit 50 calculates, for the current picture, the sum of absolute values of the differences between each Aij and the average value of the Aij in each macro-block $\Sigma|Aij-(\text{average of Aij})|$ and supplies the sum as an estimated value for intra-coding to the prediction decision circuit 54.

The motion vector detection circuit 50 calculates the sum of absolute values (or sum of squares) of the difference (Aij −Bij) between signals Aij of the macro-blocks of the current picture, and signals Bij of the macro-blocks of the prediction picture $\Sigma|Aij-Bij|$ in each of frame prediction mode and field prediction mode. As explained above, the motion vector(s) for the current picture are applied to the reference picture(s) to generate the prediction picture. When the reference picture temporally precedes the current picture, the quantity $\Sigma|Aij-Bij|$ is referred to as a forward prediction error signal, and when the reference picture temporally succeeds the current picture, the quantity $\Sigma|Aij-Bij|$ is referred to as a backward prediction error signal. When the prediction picture is the mean of a temporally preceding and a temporally succeeding reference picture, as motion-compensated, the quantity $\Sigma|Aij-Bij|$ is referred to as a bi-directional prediction error signal.

The circuit 50 supplies the forward frame prediction, the forward field prediction, the backward frame prediction, the backward field prediction, the bi-directional frame prediction and the bi-directional field prediction error signals to the prediction decision circuit 54.

The prediction decision circuit 54 selects one of intra-coding, forward inter-picture prediction, backward inter-picture prediction or bi-directional inter-picture prediction and one of frame and field prediction mode in accordance with the smallest of the estimated value for intra-coding and the forward frame, the forward field, the backward frame, the backward field, the bi-directional frame and the bi-directional field prediction error signals. The arithmetic unit 53 predictively encodes the current picture, as processed by the frame or field changeover circuit 52, in accordance with the prediction mode selected by the prediction decision circuit 54.

The motion vector detection circuit 50 serves to calculate and supply the motion vector(s) associated with the selected prediction mode to a variable length encoding circuit 58 and a motion compensation circuit 64, explained later.

The sums of the absolute values of the inter-frame differences (prediction errors) on the macro-block basis are supplied from the motion vector detection circuit 50 to the prediction mode changeover circuit 52 and to the prediction decision circuit 54, in the manner as described above.

The arithmetic unit 53 supplies predictively encoded data, also referred to as difference data, for the current picture to a DCT mode changeover circuit 55 which is adapted to process the current picture for one of frame based and field based orthogonal transformation.

The DCT changeover circuit 55 functions to compare the encoding efficiency when the DCT operations for the macro-blocks in a picture are performed with the odd field data alternating with the even field data, that is, for frame based orthogonal transformation, as shown in FIG. 8A, with the encoding efficiency when the DCT operations for the macro-blocks in a picture are performed with the odd field data separated from the even field data, that is, for field based orthogonal transformation, as shown in FIG. 8B. The circuit 55 functions to select the mode with the higher encoding efficiency.

To evaluate the encoding efficiency for frame based orthogonal transformation, the DCT mode changeover circuit 55 places the luminance macro-block data into interlaced form, as shown in FIG. 8A, and calculates the differences between the odd field line signals and even field line signals vertically adjacent to each other, and finds the sum of absolute values of the differences EFM, or the sum of squared values of the differences.

$$EFM = \sum_{j=1}^{16} \sum_{i=1}^{16} |o(i,j) - e(i,j)| + \sum_{j=1}^{16} \sum_{i=1}^{15} |e(i,j) - o(i+1,j)|$$

Eq. 1

To evaluate the encoding efficiency for field based orthogonal transformation, the DCT mode changeover circuit 55 places the luminance macro-block data into non-interlaced form, as shown in FIG. 8B, and calculates the differences between vertically adjacent odd field line signals and the differences between vertically adjacent even field line signals, and finds the sum of absolute values of the differences EFD, or the sum of squared values of the differences.

$$EFD = \sum_{j=1}^{16} \sum_{i=1}^{15} (|o(i,j) - o(i+1,j)| + |e(i,j) - e(i+1,j)|) \qquad \text{Eq. 2}$$

The DCT changeover circuit 55 compares the difference between the frame based and field based sums of the absolute values with a predetermined threshold and selects frame based DCT transformation if the difference EFM - EFD is less than the predetermined threshold.

If the frame prediction mode is selected in the prediction mode changeover circuit 52, the probability is high that the frame DCT mode will be selected in the DCT mode changeover circuit 55. If the field prediction mode is selected in the prediction mode changeover circuit 52, the probability is high that the field DCT mode will be selected in the DCT mode changeover circuit 55. However, since this is not necessarily the case, the prediction mode changeover circuit 52 sets the mode which will give the least value of the sum of the absolute values of prediction errors, while the DCT mode changeover circuit 55 sets the mode which will give the optimum orthogonal transformation encoding efficiency.

If frame based orthogonal transformation mode, also referred to as frame DCT mode, is selected, the DCT mode changeover circuit 55 functions to ensure that the four luminance blocks Y1 to Y4 and two color difference blocks Cb, Cr represent alternating or interlaced odd and even field lines, as shown in FIG. 8A.

If field based orthogonal transformation mode, also referred to as field DCT mode, is selected, the DCT mode changeover circuit 55 functions to ensure that each of the luminance blocks represents only one field, and that each of the color difference blocks has segregated or non-interlaced odd and even field lines, as shown in FIG. 8B.

The DCT mode changeover circuit 55 functions to output the data having the configuration associated with the selected DCT mode, and to output a DCT flag indicating the selected DCT mode to the variable length encoding circuit 58 and the motion compensation circuit 64.

The DCT mode changeover circuit 55 supplies appropriately configured difference picture data to a DCT circuit 56 shown in FIG. 6 which is operative to orthogonally transform it using a discrete cosine transformation into DCT coefficients, and to supply the DCT coefficient data to a quantization circuit 57 that functions to quantize the coefficient data with quantization steps selected in accordance with the volume of data stored in a transmission buffer 59 and to supply quantized data to a variable length encoding circuit 58.

The variable length encoding circuit 58 is also supplied with the quantization step or scale data from the quantization circuit 57, prediction mode data from the prediction decision circuit 54, that is data indicating which of the intrapicture prediction, forward prediction, backward prediction or bi-directional prediction is used, and motion vector data from the motion vector detection circuit 50. The encoding circuit 58 also receives prediction flag data from the prediction decision circuit 54 comprising a flag indicating which of the frame prediction mode or the field prediction mode is used, and prediction flag data from the DCT mode changeover circuit 55 comprising a flag indicating which of the frame DCT mode or the field DCT mode is used. This information is placed into the header portion of the encoded data stream.

The variable length encoding circuit 58 serves to encode the quantized data and the header information using a variable length code such as a Huffman code, in accordance with the quantization step data supplied from the quantization circuit 57, and to output the resulting data to a transmission buffer 59.

The quantized data and quantization step are also supplied to a dequantization circuit 60 which serves to dequantize the quantized data using the quantization step, and to supply the recovered DCT coefficient data to an inverse DCT circuit 61 that functions to inverse transform the DCT coefficient data to produce recovered difference data and to supply the recovered difference data to an arithmetic unit 62.

The arithmetic unit 62 combines the recovered difference data with a previously encoded and decoded reference picture, as motion compensated, to produce decoded data for a reconstructed picture which will be used as a reference picture and which is read into one of two frame memories 63a, 63b. The memories 63a, 63b are adapted to read out the reference picture data stored therein to a motion compensation circuit 64 that uses the motion vectors from the motion vector detection circuit 50 to produce a prediction picture from the reference picture. Specifically, the circuit 50 uses the motion vector to alter the readout address of the reference picture from the memory 63a or 63b.

For a group of pictures, after the first frame I-picture data and the third frame P-picture data are stored in the forward and backward prediction picture memories or units 63a, 63b, respectively, the second frame B-picture data is processed by the motion vector detection circuit 50. The prediction decision circuit 54 selects the frame or field prediction mode, while setting the prediction mode to one of intra-frame prediction mode, forward prediction mode, backward prediction mode and bi-directional prediction mode in correspondence with the sum of absolute values of predictive errors by macro-block.

Since a reconstructed B-picture is not used as a reference picture for other pictures, it is not stored in the frame memory 63.

It will be appreciated that the frame memory 63 has its forward and backward prediction picture units 63a, 63b bank-exchanged as needed so that a picture stored in one of the units 63a or 63b can be outputted as either a forward or a backward prediction picture.

The motion compensation circuit 64 functions to supply the motion compensated data as a prediction picture to the arithmetic unit 62 and to the arithmetic unit 53 which subtracts the prediction picture from the P-picture or the B-picture currently being predictively encoded.

More specifically, when the motion vector detection circuit 50 receives picture data for an I-picture from the forward original picture unit 51a, the prediction decision circuit 54 selects the intra-frame prediction mode and sets a switch 53d of the arithmetic unit 53 to an input contact a. This causes the I-picture data to be inputted directly to the DCT mode changeover circuit 55. In this case, no prediction picture is expected from the motion compensation circuit 64. The I-picture data is also supplied to the forward prediction picture unit 63a.

When the forward prediction mode is selected by the prediction decision circuit 54, the circuit 54 also sets the switch 53d to an input contact b which causes the arithmetic unit 53a to subtract the prediction picture, produced by the motion compensation circuit 64, from the picture read out from the memory 51, for each macro-block on a pixel by pixel basis, to produce difference data. The P-picture, after encoding and local decoding, is supplied to one of the units 63a, 63b. For example, if the P-picture immediately follows an I-picture, then the P-picture is stored in the backward prediction picture unit 63b.

For forward predictive encoding, the prediction picture is a reference I-picture or P-picture read out from the forward prediction picture unit 63a of the frame memory 63 and motion-compensated by the motion compensation circuit 64 in accordance with the motion vector outputted from the motion vector detection circuit 50. More specifically, for each macro-block, the motion compensation circuit 64 shifts the readout address of the forward prediction picture unit 63a in an amount corresponding to the motion vector currently output by the motion vector detection circuit 50.

When the backward prediction mode is selected by the prediction decision circuit 54, the circuit 54 also sets the switch 53d to an input contact c which causes the arithmetic unit 53b to subtract the prediction picture, produced by the motion compensation circuit 64, from the picture read out from the memory 51, on a pixel by pixel basis, to produce difference data.

For backward predictive encoding, the prediction picture is a P-picture read out from the backward prediction picture unit 63b of the frame memory 63 and motion-compensated by the motion compensation circuit 64 in accordance with the motion vector outputted from the motion vector detection circuit 50. More specifically, for each macro-block, the motion compensation circuit 64 shifts the readout address of the backward prediction picture unit 63b in an amount corresponding to the motion vector currently output by the motion vector detection circuit 50.

When the bi-directional prediction mode is selected by the prediction decision circuit 54, the circuit 54 sets the switch 53d to an input contact d which causes the arithmetic unit 53c to subtract a prediction picture from the picture read out from the memory 51, on a pixel by pixel basis, to produce difference data. The prediction picture is the mean value of a forward prediction picture and a backward prediction picture.

In the case of bi-directional prediction, the picture stored in the forward prediction picture unit 63a, and the picture stored in the backward prediction picture unit 63b, are read out and motion-compensated by the motion compensation circuit 64 in dependence upon the motion vectors outputted from the motion vector detection circuit 50. More specifically, for each macro-block, the motion compensation circuit 64 shifts the readout address of the forward and backward prediction picture units 63a, 63b in an amount corresponding to the appropriate one of the motion vectors currently output by the motion vector detection circuit 50.

The transmission buffer 59 temporarily stores the data supplied thereto, generates control data indicating the volume of data stored therein and supplies the control data to the quantization circuit 57. When the volume of data stored in the transmission buffer 59 reaches a predetermined upper limit value, the control data from the transmission buffer 59 causes the quantization scale of the quantization circuit 57 to increase so as to decrease the volume of the quantized data. Similarly, when the volume of data stored in the transmission buffer 59 reaches a predetermined lower limit value, the control data from the transmission buffer 59 causes the quantization scale of the quantization circuit 57 to decrease so as to increase the volume of the quantized data. In this manner, the transmission buffer 59 prevents the data supplied thereto from overflowing or underflowing its capacity. The data stored in the transmission buffer 59 are read out at a predetermined timing to an output terminal 69 and thence to a transmission channel for recording on, for example, the recording medium 3.

Although the foregoing description has been made with reference mainly to the luminance blocks, the color difference blocks are similarly processed and transmitted using the motion vector which corresponds to the motion vector of the luminance block halved in both the vertical and horizontal directions.

FIG. 9 illustrates the decoder 31 shown in FIG. 4.

The reproduced encoded picture data transmitted from the recording medium 3 is applied to a reception circuit, not shown, or to an input terminal 80 which applies the encoded picture data to a reception buffer 81 that serves to temporarily store the encoded picture data and to supply this data to a variable length decoding circuit 82 of a decoding circuit 90.

The variable length decoding circuit 82 functions to variable length decode the encoded data, to output the recovered motion vector, prediction mode data, prediction flags and DCT flags to the motion compensation circuit 87, and to output the quantization step data and variable length decoded picture data, including the predictive mode, the motion vector, the predictive flag, the DCT flag and the quantized picture data for each macro-block, to an inverse quantization circuit 83.

The inverse quantization circuit 83 is adapted to dequantize the picture data supplied from the variable length decoding circuit 82 in accordance with the quantization step data supplied from the variable length decoding circuit 82 and to output the thus recovered coefficient data to an inverse transformation IDCT circuit 84.

The IDCT circuit 84 is adapted to perform an inverse transformation on the recovered coefficient data to produce recovered difference data, and to supply the recovered difference data to an arithmetic unit 85.

If the recovered difference data supplied from the IDCT circuit 84 represents an I-picture, the arithmetic unit 85 does not process the data and simply supplies it through an output terminal 91 to the format converting circuit 32 shown in FIG. 4, and to a forward prediction picture unit 86a of a frame memory 86.

If the recovered difference data supplied from the IDCT circuit 84 represents a macro-block of a P-picture produced in the forward prediction mode, then the reference picture data of the preceding frame, as stored in the forward prediction picture memory 86a of the frame memory 86, is read and motion-compensated by a motion compensation circuit 87 in dependence upon the motion vector outputted from the variable length decoding circuit 82 to generate a prediction picture. Specifically, the motion compensation circuit 87 uses the motion vector to alter the read out address supplied to the memory 86a. The arithmetic unit 85 adds the prediction picture to the recovered difference data to produce a decoded or reconstructed picture which is stored in a backward prediction picture memory 86b of the frame memory 86. The decoded P-picture is retained in the decoder 31, and output after the next B-picture is decoded and output, so as to restore the pictures to the order in which they were supplied to the encoder 18 of FIG. 4.

Even if the macro-block of the P-picture was encoded as intra-coded mode data, the decoded P-picture is directly stored in the backward prediction picture unit 86*b*, without being output to the output terminal 91 by the arithmetic unit 85.

If the recovered difference data supplied from the IDCT circuit 84 represents a macro-block of a B-picture encoded in the intra-coding mode, as determined from the prediction mode supplied from the variable length decoding circuit 82 to the motion compensation circuit 87, a prediction picture is not generated.

If the recovered difference data supplied from the IDCT circuit 84 represents a macro-block of a B-picture encoded in the forward prediction mode, as determined from the prediction mode supplied from the variable length decoding circuit 82 to the motion compensation circuit 87, the data stored in the forward prediction picture unit 86*a* of the frame memory 86 is read out and motion compensated by the motion compensation circuit 87 using the motion vector supplied from the variable length decoding circuit 82 to form the prediction picture. The arithmetic unit 85 sums the recovered difference data with the prediction picture to form the recovered B-picture.

If the recovered difference data supplied from the IDCT circuit 84 represents a macro-block of a B-picture encoded in the backward prediction mode, as determined from the prediction mode supplied from the variable length decoding circuit 82 to the motion compensation circuit 87, the data stored in the backward prediction picture unit 86*b* is read out and motion compensated by the motion compensation circuit 87 using the motion vector supplied from the variable length decoding circuit 82 to form the prediction picture. The arithmetic unit 85 sums the recovered difference data with the prediction picture to form the recovered B-picture.

If the recovered difference data supplied from the IDCT circuit 84 represents a macro-block of a B-picture encoded in the bi-directional prediction mode, as determined from the prediction mode supplied from the variable length decoding circuit 82 to the motion compensation circuit 87, the data stored in both the forward and backward prediction picture memories 86*a*, 86*b* are read out and respectively motion compensated by the motion compensation circuit 87 using the motion vectors supplied from the variable length decoding circuit 82, then averaged to form the prediction picture. The arithmetic unit 85 sums the recovered difference data with the prediction picture to form the recovered B-picture.

The recovered B-picture is supplied via the output terminal 91 to the format converting circuit 32. However, since the B-picture is not utilized for generating a prediction picture for other pictures, it is not stored in the frame memory 86.

After outputting of the B-picture, picture data of the P-picture stored in the backward prediction picture unit 86*b* is read and supplied via the motion compensation circuit 87 to the arithmetic unit 85. Motion compensation is not performed at this time.

The counterpart circuits to the prediction mode changeover circuit 52 and the DCT mode changeover circuit 55 in the encoder 18 of FIG. 6 are not shown in the decoder 31. The processing to be performed by these circuits, that is, the processing for restoring the configuration in which odd-field line signals and even-field line signals are separated from each other to the configuration in which odd and even-field line signals alternate with each other, is performed by the motion compensation circuit 87.

The processing of the luminance signals has been explained in the foregoing. As will be appreciated by one of ordinary skill in the art, the processing of the color difference signals is carried out in a similar manner. However, the motion vector employed in such case is the motion vector for luminance signals which is halved in both the vertical and horizontal directions.

FIG. 10 shows the signal to noise ratio (SNR) for pictures transmitted using the above-described technique. As can be seen, the best quality transmission is obtained for I-pictures, good quality transmission is obtained for P-pictures, and the poorest quality transmission is obtained for B-pictures. Thus, if the transmission path has adequate capacity, it is preferable to transmit a picture as an I-picture.

If all pictures cannot be transmitted as I-pictures, it is better to transmit a series of pictures as shown in FIG. 10, rather than in a format in which one average picture quality is used for all pictures. The technique shown in FIG. 10 takes advantage of the human visual sense characteristic of perceiving a series of changing picture quality, as shown in FIG. 10, as of higher quality than a series of unchanging picture quality, for a predetermined transmission rate.

Accordingly, in the configuration of FIG. 6, transmission rate control is carried out by the quantizer 57 in order to attain the picture quality perceived as better.

To dub pictures, two coder-decoder (codec) units are used in series. However, the picture quality obtained from the second codec is substantially worse than the picture quality obtained from the first codec, as explained below.

FIG. 11 shows a configuration representing two codecs connected by an analog connection, namely, coder 201, decoder 202, coder 203 and decoder 204, connected in series.

In FIG. 11, an analog video signal is supplied to an input terminal 200 as an input signal a. The input terminal 200 functions to apply the analog video signal to an A/D converter 211 of coder 201. The converter 211 is adapted to convert the analog video signal to a digital video signal, and to apply the digital video signal to coding circuit 212 that serves to encode this signal as previously described to produce a coded digital video signal.

The coded digital video signal from coding circuit 212 of coder 201 is supplied to a decoding circuit 213 of decoder 202 which is adapted to decode the coded digital video signal and to apply the decoded video signal to D/A converter 214.

The analog video signal produced by D/A converter of decoder 202 is supplied as an output signal b to the coder 203, which functions in a similar manner as the coder 201.

The digital video signal produced by the coder 203 is supplied to decoder 204 which functions in a similar manner as the decoder 202. The decoder 204 delivers an analog video signal as an output signal c to a terminal 205, which may transmit the signal c to another coder (not shown) and so on.

FIG. 12 shows the SNR of the output signals b, c shown in FIG. 11. The SNR of the output signal c is seen to be substantially worse than the SNR of the output signal b.

The deterioration in picture quality results from a mismatch between the picture type applied in the first codec and the picture type applied in the second codec. Namely, if a picture coded as a B picture in the first coder/decoder pair is coded as, e.g., P picture in the second coder/decoder pair, a great deterioration of picture quality results because the picture quality changes as a function of the picture type.

Since the deterioration in picture quality results from the mismatch between picture types of respective stages of codecs, such deterioration similarly takes place when digital connections are used between respective codecs.

FIG. 13 shows a configuration representing two codecs connected by a digital connection, namely, coder 302, decoder 303, coder 304 and decoder 305, connected in series.

An analog video signal is supplied to terminal 300, which supplies the analog video signal as an input signal a to A/D converter 301 that serves to digitize the signal a, and to apply the digital signal to a digital interface 311 of coder 302. The digital interface 311 applies the signal supplied thereto to a coding circuit 312 which encodes or compresses the digital video data to an encoded digital video bit stream.

The encoded digital video signal from the coding circuit 312 is supplied to decoding circuit 313 of decoder 303 that decodes the signal supplied thereto, and applies the decoded signal to digital interface 314. The interface 314 functions to output the decoded signal as an output signal b.

The output signal b is supplied to coder 304 which functions in a similar manner as coder 302 to produce a coded signal that is applied to decoder 305 which functions in a similar manner as decoder 303. The digital signal output from the decoder 303 is supplied to a D/A converter that serves to convert the signal supplied thereto to an analog video signal and to supply the analog video signal as an output signal c to output terminal 307.

FIG. 12 also generally represents the SNR of the output signals b, c shown in FIG. 13.

OBJECTS AND SUMMARY OF THE INVENTION

Therefore, an object of the present invention is to provide a method and apparatus for encoding and decoding picture signals which avoids the aforementioned disadvantages of the prior art.

Another object of the present invention is to provide a method and apparatus for transmitting and receiving picture signals in serial stages which minimizes the deterioration in picture quality at each stage.

Yet another object of the present invention is to match the type of coding applied to pictures of a picture signal in serial processing stages, each stage comprising coding and decoding.

In accordance with an aspect of the present invention, a picture signal is processed by receiving a picture type signal indicating one of intra-picture coding, predictive coding and bi-directionally predictive coding for respective pictures represented by the picture signal. The picture signal is encoded as a function of the picture type signal to produce an encoded picture signal.

In accordance with another aspect of the present invention, an encoded picture signal is processed by decoding the encoded picture signal to produce a picture type signal and a decoded picture signal. The picture type signal and the decoded picture signal are multiplexed to produce an output signal.

The above, and other objects, features and advantages of the present invention will be apparent from the following detailed description of the preferred embodiments of the present invention when read in conjunction with the accompanying drawings in which corresponding parts are identified by the same reference numeral.

BRIEF DESCRIPTION OF THE DRAWINGS

FIGS. 1A and 1B are pictures illustrating inter-frame correlation;

FIGS. 2A and 2B are diagrams illustrating types of pictures used in predictive encoding;

DETAILED DESCRIPTION OF THE PREFERRED EMBODIMENTS

The present invention comprises a picture type identifier which is included with the picture signal at all times, namely, when the signal is encoded and when the signal is decoded. The picture type indicates one of intra-picture coding (an I-picture), predictive coding (a P-picture) and bi-directionally predictive coding (a B-picture). An I-picture includes macro-blocks encoded by only intra-coding. A P-picture includes macro-blocks encoded by intra-coding and/or macroblocks encoded by forward predictive coding. A B-picture includes macro-blocks encoded by intra-coding and/or macroblocks encoded by forward predictive coding and/or macroblocks encoded by backward predictive coding and/or macroblocks encoded by bi-directionally predictive coding.

Initially, each picture of a picture signal is encoded as a function of a respective picture type, then appropriately decoded. The decoded picture signal includes the respective picture types, preferably in the vertical blanking interval of each decoded picture. The decoded picture signal may be further processed by, for example, dubbing.

When the pictures of the decoded picture signal are again encoded, the re-encoding is a function of the picture type included in the decoded picture signal. The re-encoded signal includes the picture type. Subsequent decoding of the re-encoded picture is a function of the picture type. Each picture of the re-decoded picture signal includes its respective picture type.

Thus, the present invention matches the type of predictive coding applied to pictures in a picture signal by serially arranged coders which process the picture signal.

The present invention promotes optimum picture quality. A picture, previously encoded as an I-picture, P-picture or B-picture is again encoded as an I-picture, P-picture or B-picture, respectively. Also, encoding of a picture, previously encoded as a B-picture, as an I-picture or a P-picture is prevented. Thus, deterioration in signal quality after plural coding and decoding operations is minimized.

Figure 14:
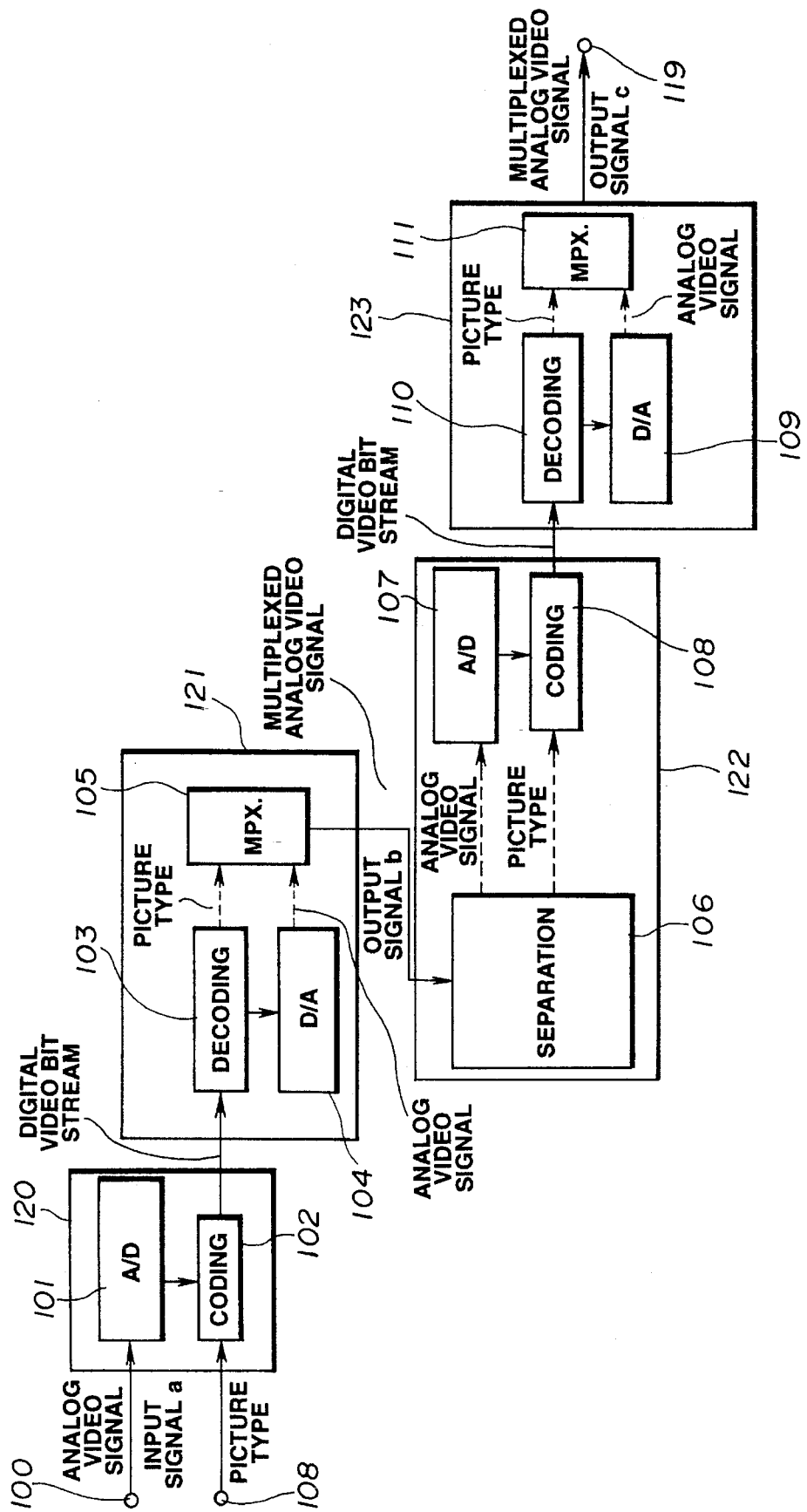
FIG. 14 is a block diagram showing two video codecs according to the present invention connected in series using an analog connection.

Referring now to the drawings, and in particular to FIG. 14, there are illustrated coding and decoding units (codecs) according to the present invention having a serial analog connection therebetween. A first codec comprises coder 120 and decoder 121, while a second codec comprises coder 122 and decoder 123. It will be appreciated by one of ordinary skill in the art that additional codecs may be serially connected to those shown in FIG. 14.

In FIG. 14, an analog video signal is supplied to an input terminal 100 as an input signal a, and a picture type signal is supplied to an input terminal 108. The picture type indicates one of intra-picture coding (an I-picture), predictive coding (a P-picture) and bi-directionally predictive coding (a B-picture).

The input terminals 100, 108 function to apply the analog video signal and the picture type signal, respectively, to an A/D converter 101 and a coding circuit 102, respectively, of coder 120. The converter 101 is adapted the convert the analog video signal to a digital video signal, and to apply the digital video signal to the coding circuit 102.

The coding circuit 102 serves to encode the digital video signal as a function of the picture type signal to produce a coded digital video signal which includes, for each encoded picture, its picture type as identified by the picture type signal. More specifically, if the picture type for a picture indicates intra-picture coding, then the coding circuit 102 codes the picture as an I-picture. If the picture type for a picture indicates predictive coding, then the coding circuit 102 codes the picture as a P-picture. If the picture type for a picture indicates bi-directionally predictive coding, then the coding circuit 102 codes the picture as a B-picture.

Figures 3A, 3B:
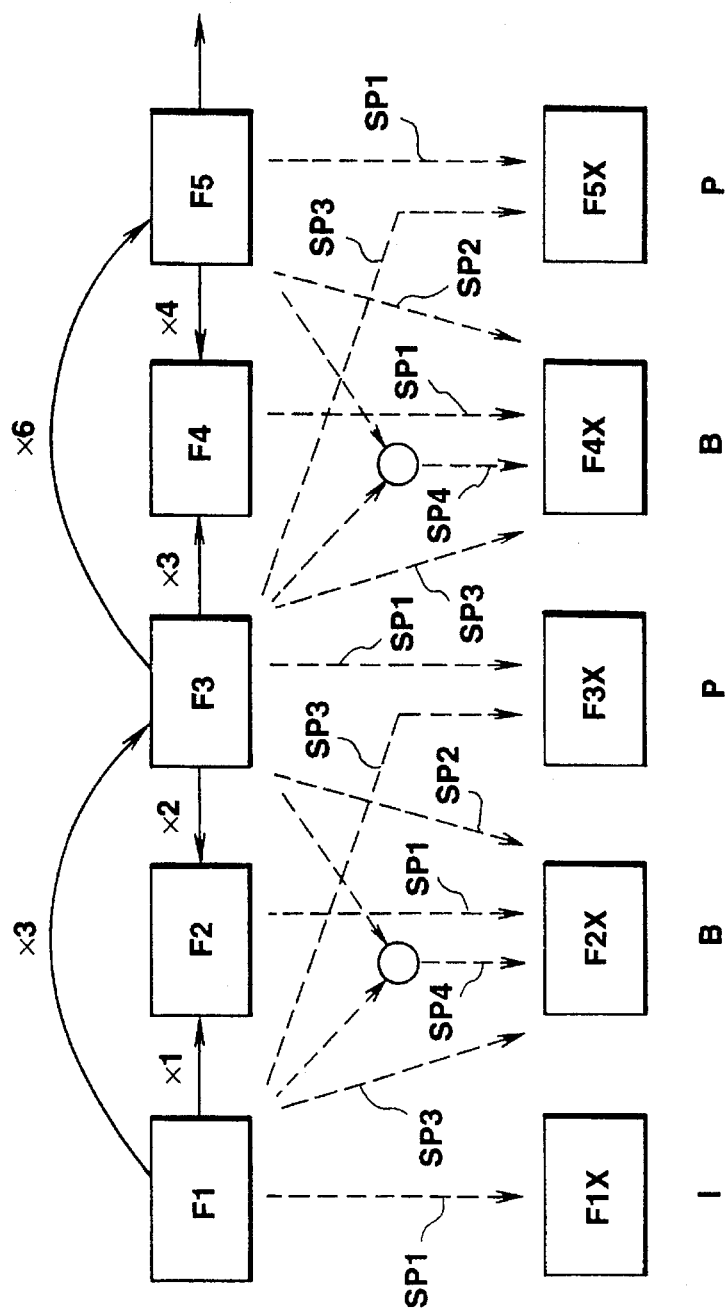
FIGS. 3A and 3B are a diagram illustrating how picture signals are converted into encoded data for transmission.
Figure 4:
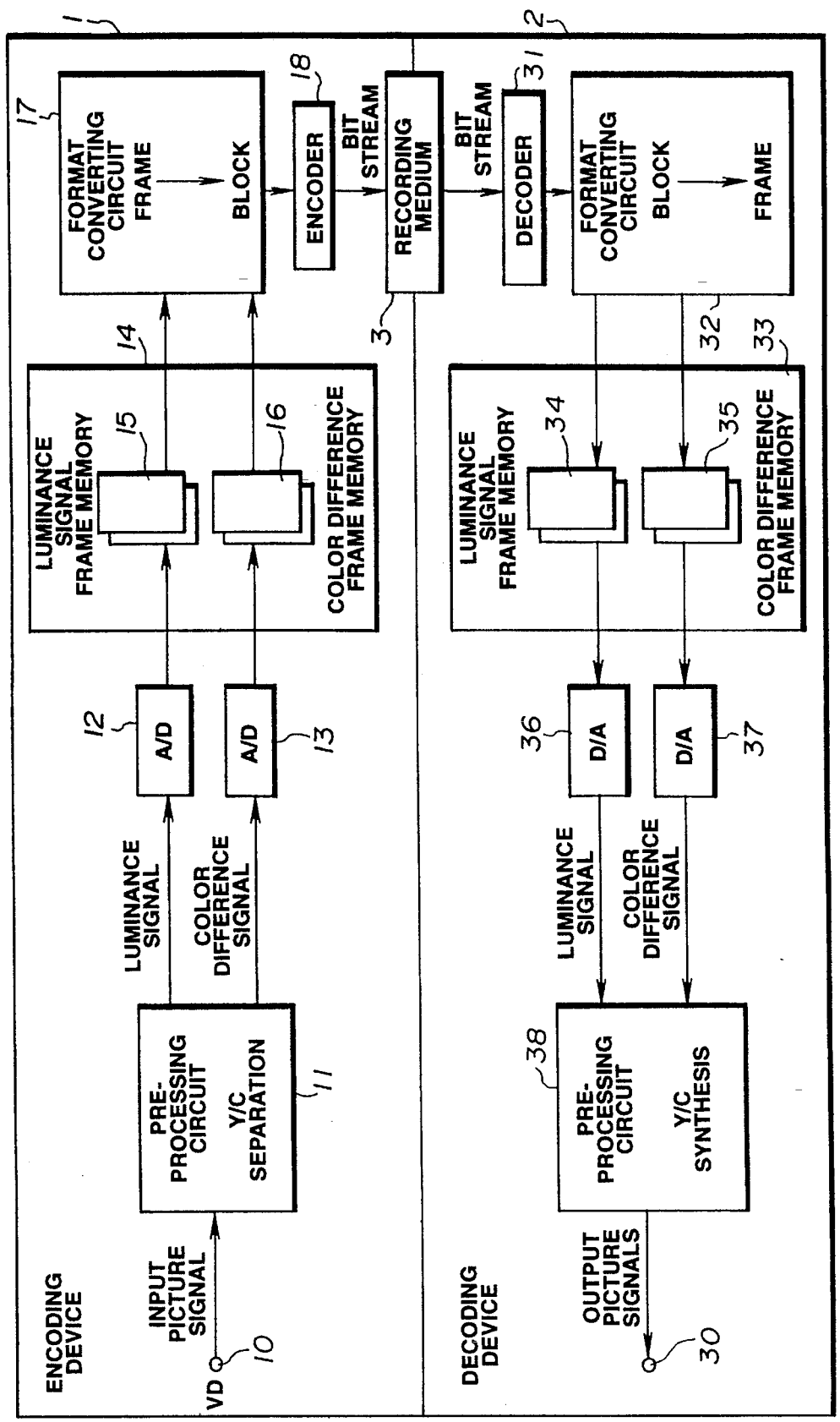
FIG. 4 is a block diagram showing a conventional device for encoding and decoding picture signals.
Figure 5:
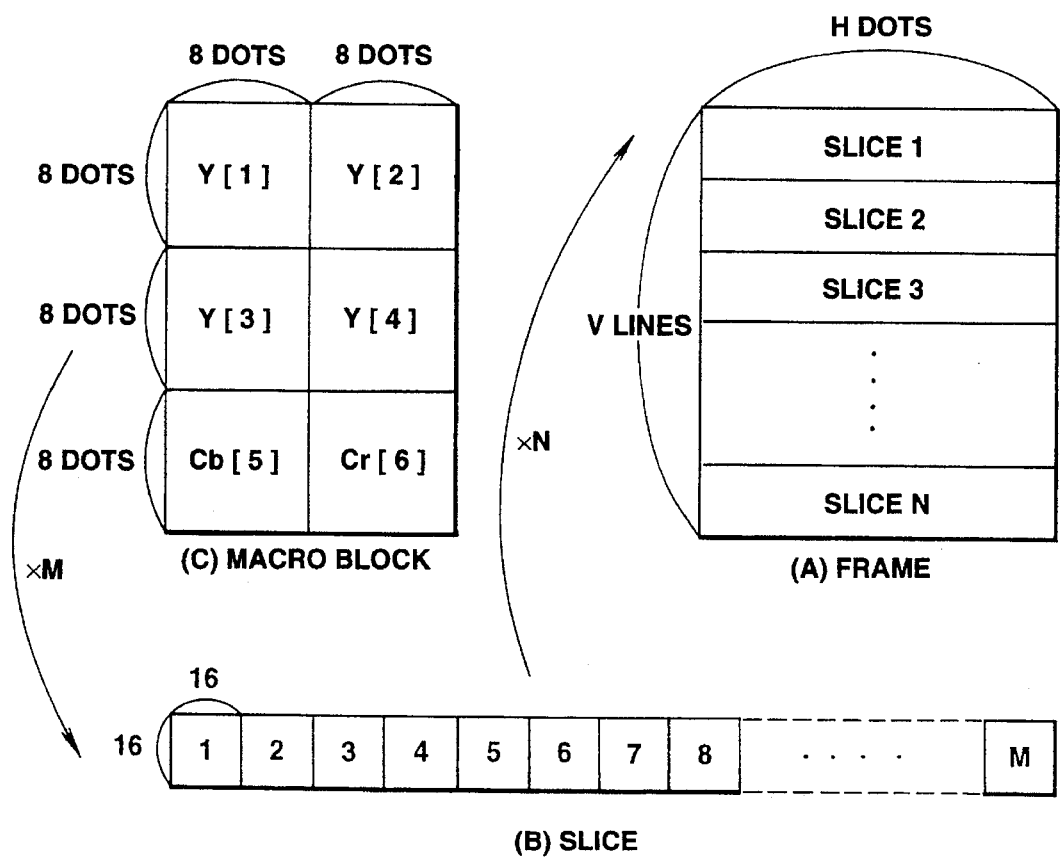
FIG. 5 is a diagram referred to in explaining the operation of the format converting circuit shown in FIG. 4.
Figure 6:
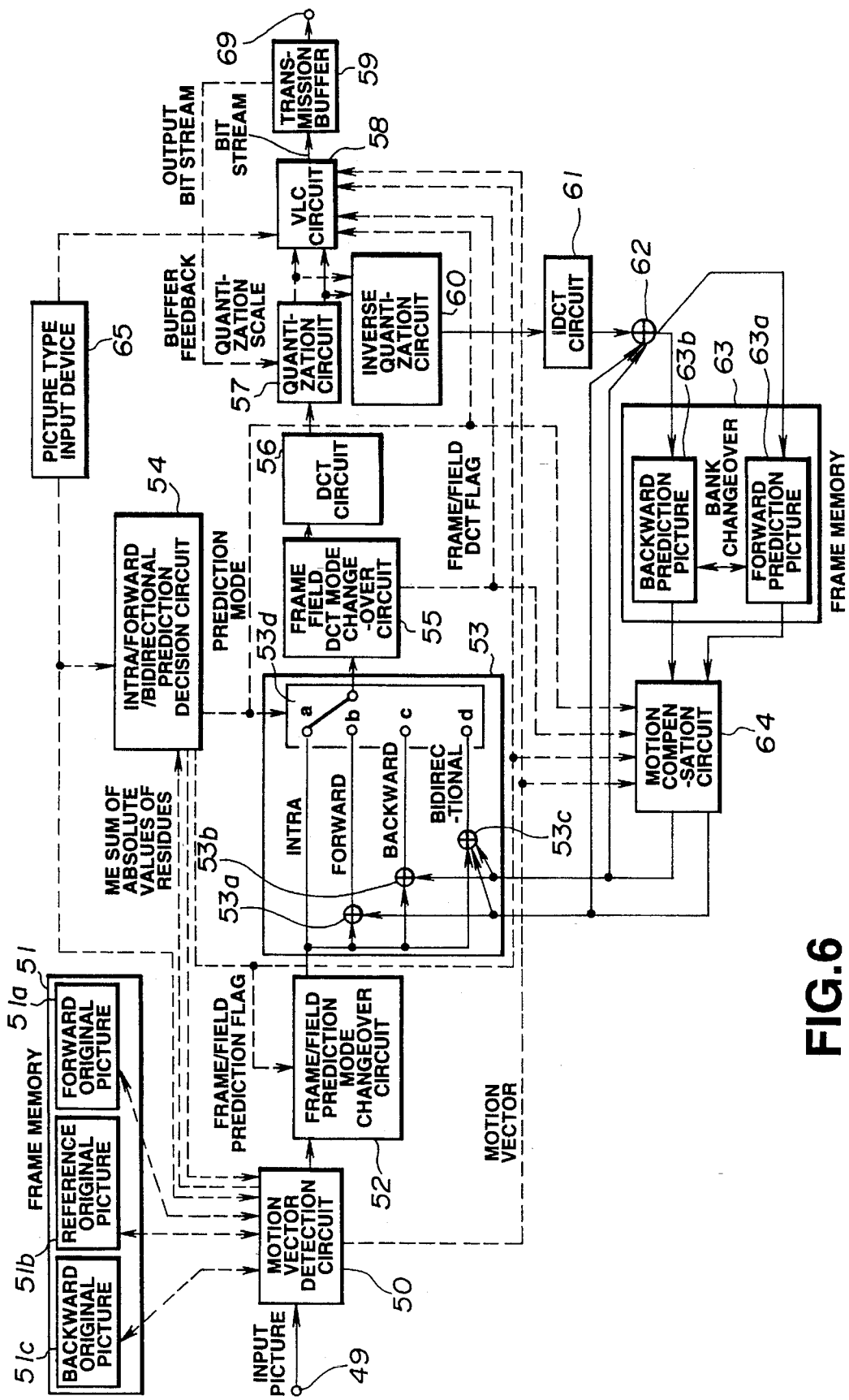
FIG. 6 is a block diagram showing the encoder of the device shown in FIG. 4.
Figure 7:
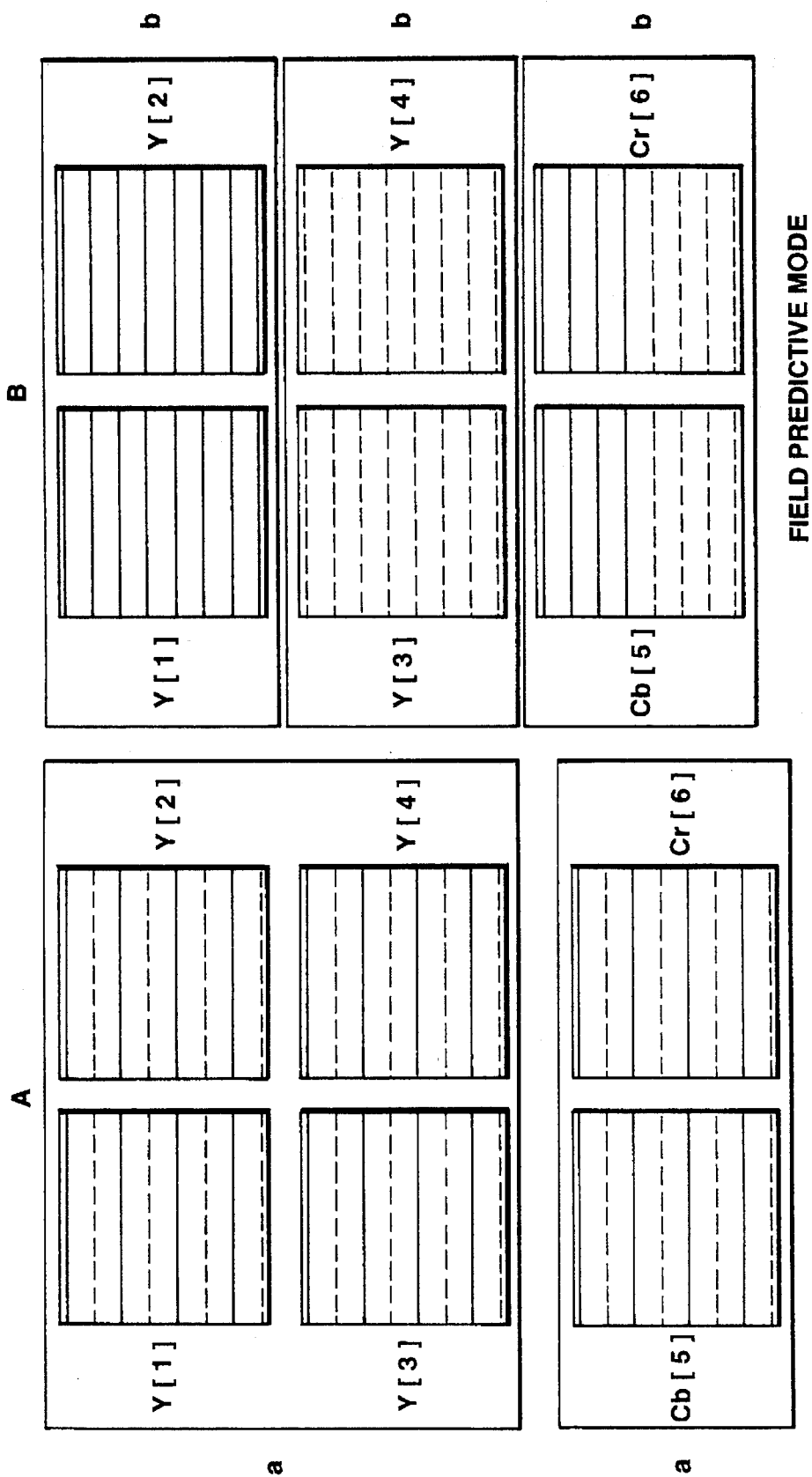
FIG. 7 is a chart referred to in explaining the predictive encoding operation of the encoder shown in FIG. 6.
Figure 8:
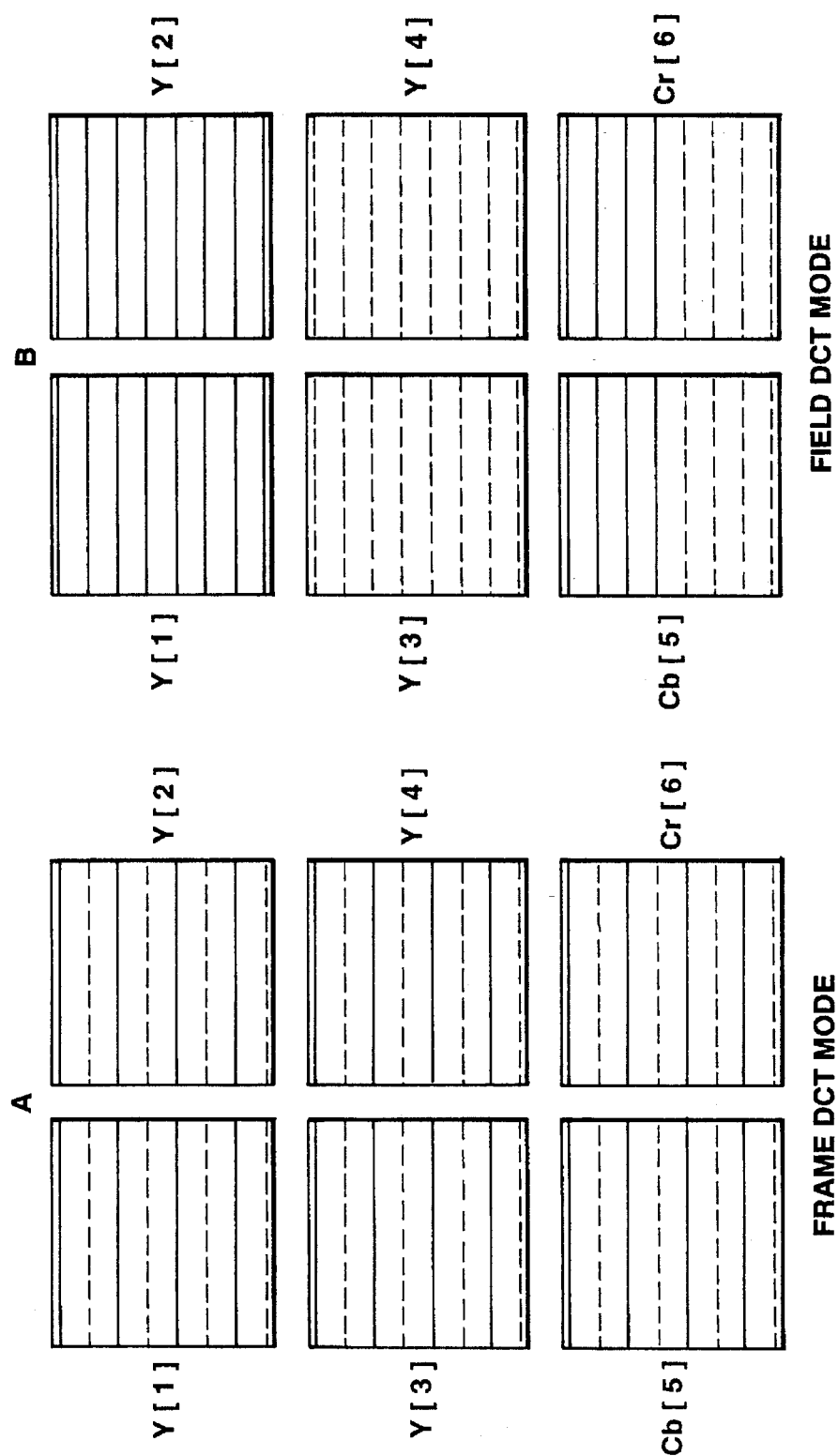
FIG. 8 is a chart referred to in explaining the orthogonal transformation operation of the encoder shown in FIG. 6.

The coding unit 120 may alternatively have the structure shown in FIG. 6, in which coding is performed without reference to an externally supplied picture type. As used herein, an externally supplied picture type means a picture type supplied from generally the same source as supplies the digital video signal, rather than from a separate source as is shown in FIG. 6, namely, the picture type input device 65.

The coded digital video signal from coding circuit 102 of FIG. 14 is supplied to a decoding circuit 103 of decoder 121 which is adapted to decode the coded digital video signal as a function of the picture type included in the encoded signal and to apply the decoded video signal to D/A converter 104. The decoding circuit 103 is further adapted to apply the picture type decoded from the coded digital video signal to a multiplexer 105.

The multiplexer 105 is operative to multiplex the picture type information with the decoded video signal to produce a multiplexed analog video signal as an output signal b in which the picture type information is contained in the decoded video signal. Preferably, the multiplexer 105 inserts the picture type for a picture of the decoded video signal into the vertical blanking interval of the picture. As mentioned, a picture may be either a frame or a field of the video signal.

The output signal b is supplied from the multiplexer 105 to a separating circuit 106 of the coder 122. The separating circuit is operative to separate or demultiplex the analog video signal and the picture type information from the output signal b, to supply the separated analog video signal to an A/D converter 107, and to supply the separated picture type information to a coding circuit 108. The converter 107 is adapted the convert the separated analog video signal to a digital video signal, and to apply the digital video signal to the coding circuit 108.

The coding circuit 108 serves to encode the digital video signal as a function of the separated picture type to produce a re-coded digital video signal which includes, for each re-encoded picture, its picture type as identified by the separated picture type signal.

The re-coded digital video signal from the coding circuit 108 is supplied to the decoder 123, which operates in a similar manner as the decoder 121.

Decoding circuit 110 of decoder 123 decodes the re-coded digital video signal to produce a re-decoded digital video signal and a corresponding picture type signal. The re-decoded digital video signal is converted to an analog signal by D/A converter 109, and applied to a multiplexer 111 which multiplexes the analog video signal with the picture type signal from decoding circuit 110 to produce a multiplexed analog video signal as an output signal c. Preferably, the multiplexer 111 inserts the picture type for a picture into the vertical blanking interval of the picture. The multiplexer 111 applies its output signal c to an output terminal 119.

Due to the inclusion of the picture type identifier in the signals b and c, the codecs of FIG. 14 process respective pictures of the video signals b and c in the same manner, that is, as the same one of an I-picture, a P-picture or a B-picture.

Figure 15:
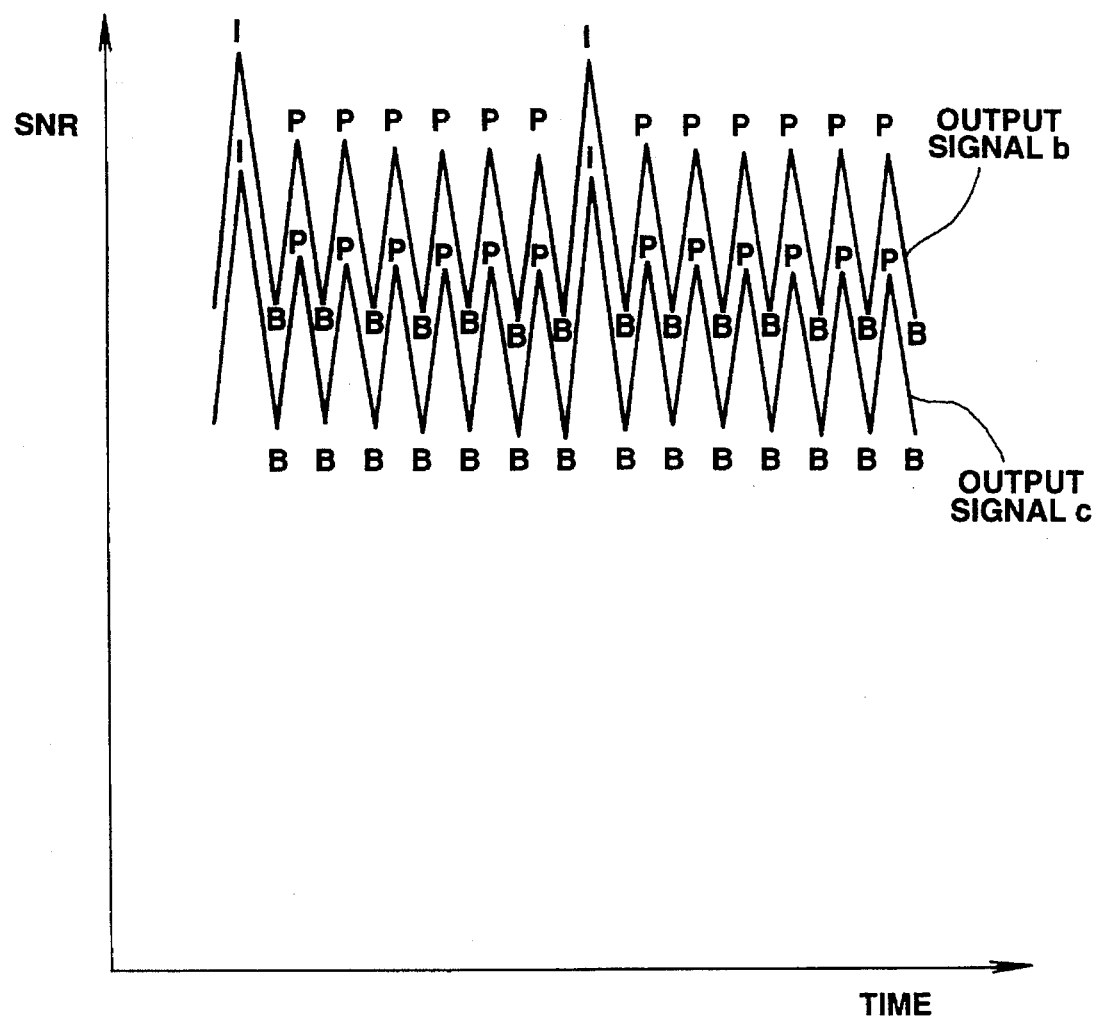
FIG. 15 is a graph showing picture quality of the signals output by the codecs of FIG. 14.

FIG. 15 shows the SNR of the output signals b, c shown in FIG. 14. The SNR of the output signal c is seen to be only slightly worse than the SNR of the output signal b.

That is, since the type of predictive coding applied to each picture is the same in each of the serially arranged codecs, the deterioration in picture quality at each codec is minimized even when the picture quality changes from picture to picture due to the type of predictive coding employed from picture to picture.

Figure 16:
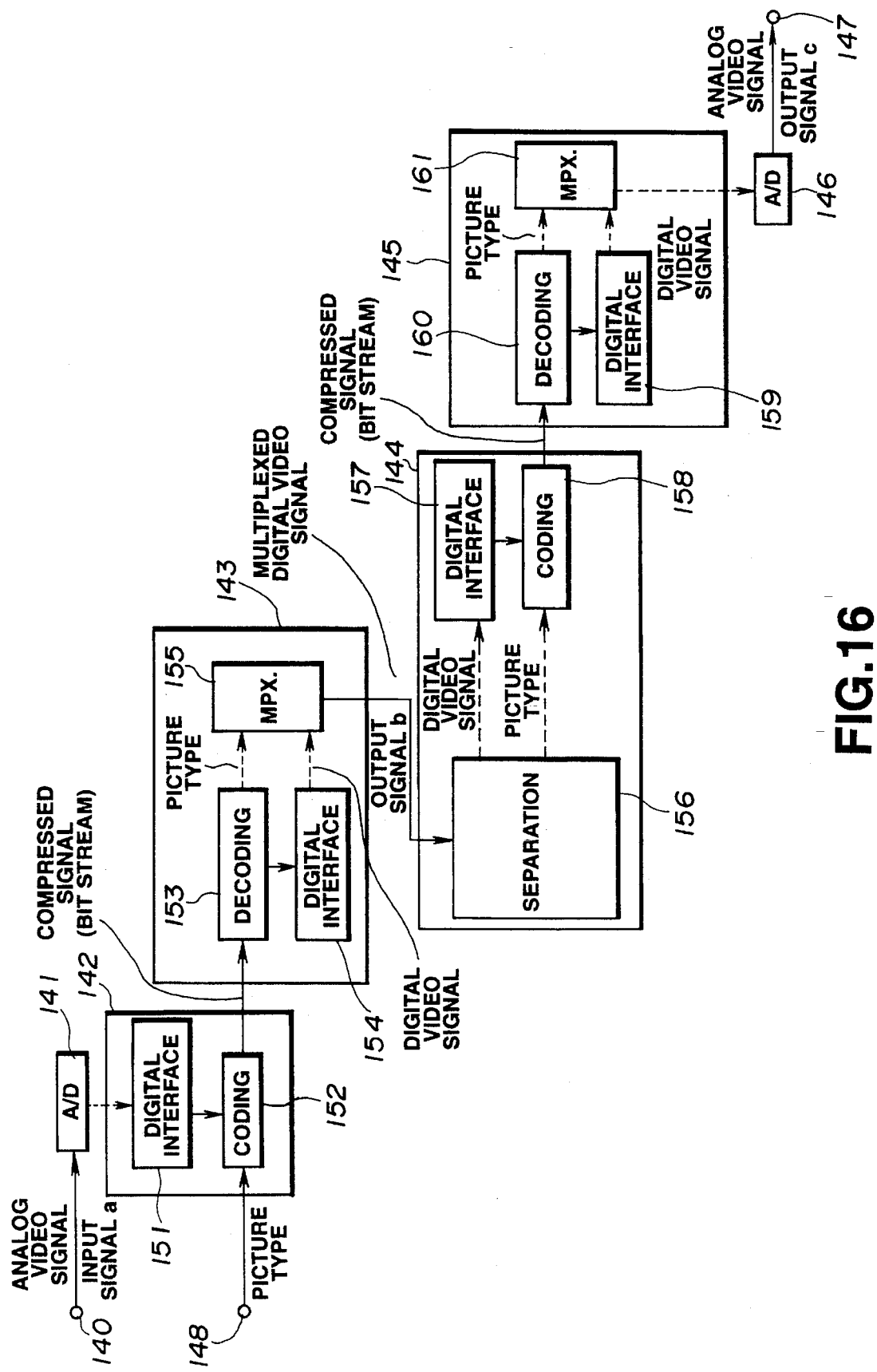
FIG. 16 is a block diagram showing two video codecs according to the present invention connected in series using a digital connection.

FIG. 16 shows codecs according to the present invention having a serial digital connection therebetween. A first codec comprises coder 142 and decoder 143, while a second codec comprises coder 144 and decoder 145.

In FIG. 16, an analog video signal is supplied to an input terminal 140 as an input signal a, and a picture type signal is supplied to an input terminal 148. The input terminals 140, 148 function to apply the analog video signal and the picture type signal, respectively, to an A/D converter 141 and a coding circuit 152 of coder 142, respectively. The converter 141 is adapted the convert the analog video signal to a digital video signal, and to apply the digital video signal to a digital interface 151 of coder 142.

The coding circuit 152 serves to encode the digital video signal as a function of the picture type signal to produce a coded digital video signal which includes, for each encoded picture, its picture type as identified by the picture type signal. More specifically, if the picture type for a picture indicates intra-picture coding, then the coding circuit 152 codes the picture as an I-picture. If the picture type for a picture indicates predictive coding, then the coding circuit 152 codes the picture as a P-picture. If the picture type for a picture indicates bi-directionally predictive coding, then the coding circuit 152 codes the picture as a B-picture.

The coding unit 120 may alternatively have the structure shown in FIG. 6, in which coding is performed without reference to an externally supplied picture type.

The coded digital video signal from coding circuit 152 is supplied to a decoding circuit 153 of decoder 143 which is adapted to decode the coded digital video signal as a function of the picture type included in the encoded signal and to apply the decoded video signal to a digital interface 154. The decoding circuit 153 is further adapted to apply the picture type decoded from the coded digital video signal to a multiplexer 155.

The multiplexer 155 is operative to multiplex the picture type information with the decoded video signal to produce a multiplexed digital video signal as an output signal b in which the picture type information is contained in the decoded video signal. Preferably, multiplexer 105 multiplexes the picture type for a picture of the decoded video signal as a flag in the respective picture.

The output signal b is supplied from the multiplexer 155 to a separating circuit 156 of the coder 144. The separating circuit is operative to separate or demultiplex the digital video signal and the picture type information from the output signal b, to supply the separated digital video signal to a digital interface 157, and to supply the separated picture type information to a coding circuit 158. The interface 157 is adapted to apply the separated digital video signal to the coding circuit 158.

The coding circuit 158 serves to encode the separated digital video signal as a function of the separated picture type to produce a re-coded digital video signal which includes, for each re-encoded picture, its picture type as identified by the separated picture type signal.

The re-coded digital video signal from the coding circuit 158 is supplied to the decoder 145, which operates in a similar manner as the decoder 143.

Decoding circuit 160 of decoder 145 decodes the re-coded digital video signal to produce a re-decoded digital video signal and a corresponding picture type signal. The re-decoded digital video signal is supplied to a digital interface 159 and thence to a multiplexer 161 which multiplexes the re-decoded digital video signal with the picture type signal from decoding circuit 160 to produce a multiplexed digital video signal. The multiplexer 161 multiplexes the picture type signal as a flag in the re-decoded digital video signal.

The multiplexer 161 supplies the multiplexed digital video signal to an A/D converter 146 which serves to convert the multiplexed digital video signal to an analog video signal also referred to as output signal c. The converter 146 applies the output signal c to an output terminal 147.

Due to the inclusion of the picture type identifier in the signals b and c, the codecs of FIG. 16 process respective pictures of the video signals b and c in the same manner, that is, as the same one of an I-picture, a P-picture or a B-picture. Consequently, the deterioration in picture quality at each codec is minimized even when the picture quality changes from picture to picture due to the type of predictive coding employed from picture to picture.

Figure 17:
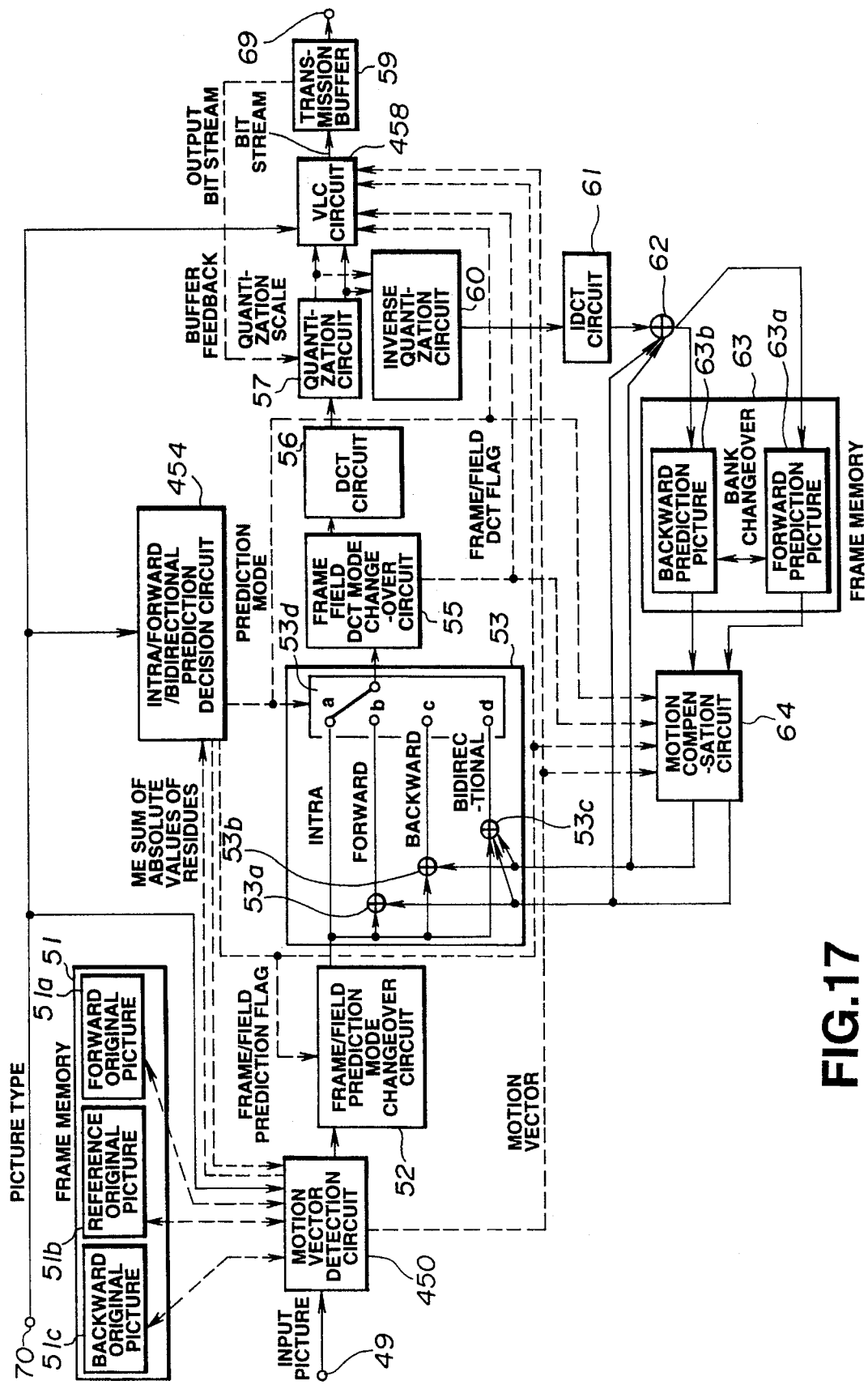
FIG. 17 is a block diagram showing a coder circuit according to the present invention.

FIG. 17 shows the coding circuits of FIGS. 14 and 16 in more detail. In FIG. 17, elements similar to those in FIG. 6 are indicated by the same reference numerals, and detailed explanations thereof are omitted.

In FIG. 17, a picture type signal is supplied to input terminal 70 which serves to supply the picture type signal to motion vector detector 450, predictive judging circuit 454 and variable length coding circuit 458. The processing performed by elements 450, 454 and 458 is similar to the processing performed by elements 50, 54 and 58 of FIG. 6, except that the elements of FIG. 17 perform in accordance with the picture type identified in the external picture type signal which indicates the picture type used in previous coding. The variable length coding circuit 458 includes the picture type based on the external picture type signal as part of the header information.

Figure 18:
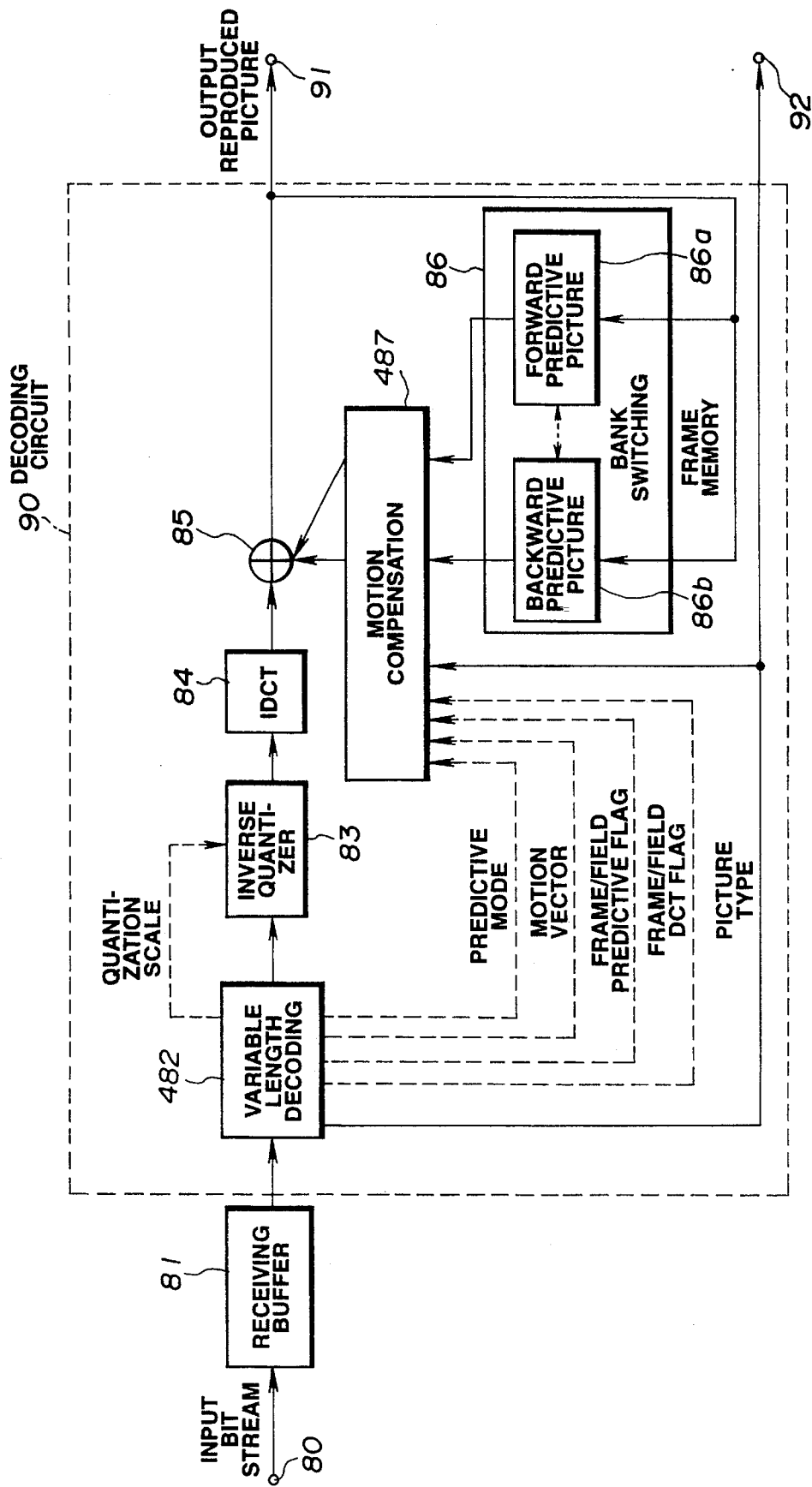
FIG. 18 is a block diagram showing a decoding circuit according to the present invention.

FIG. 18 shows the decoding circuits of FIGS. 14 and 16 in more detail. In FIG. 18, elements similar to those in FIG. 9 are indicated by the same reference numerals, and detailed explanations thereof are omitted.

Figure 9:
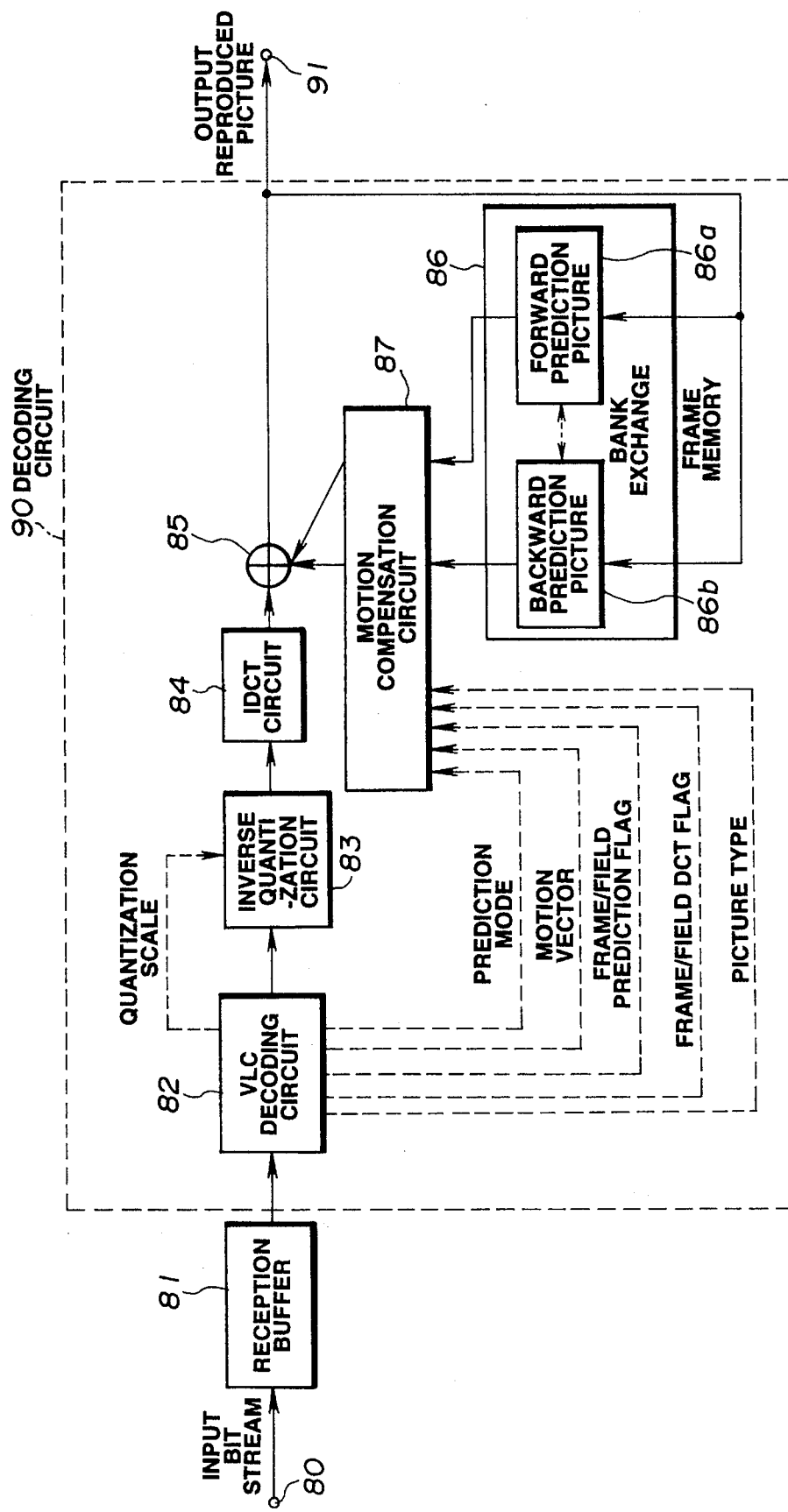
FIG. 9 is a block diagram showing the decoder of the device shown in FIG. 4.
Figure 10:
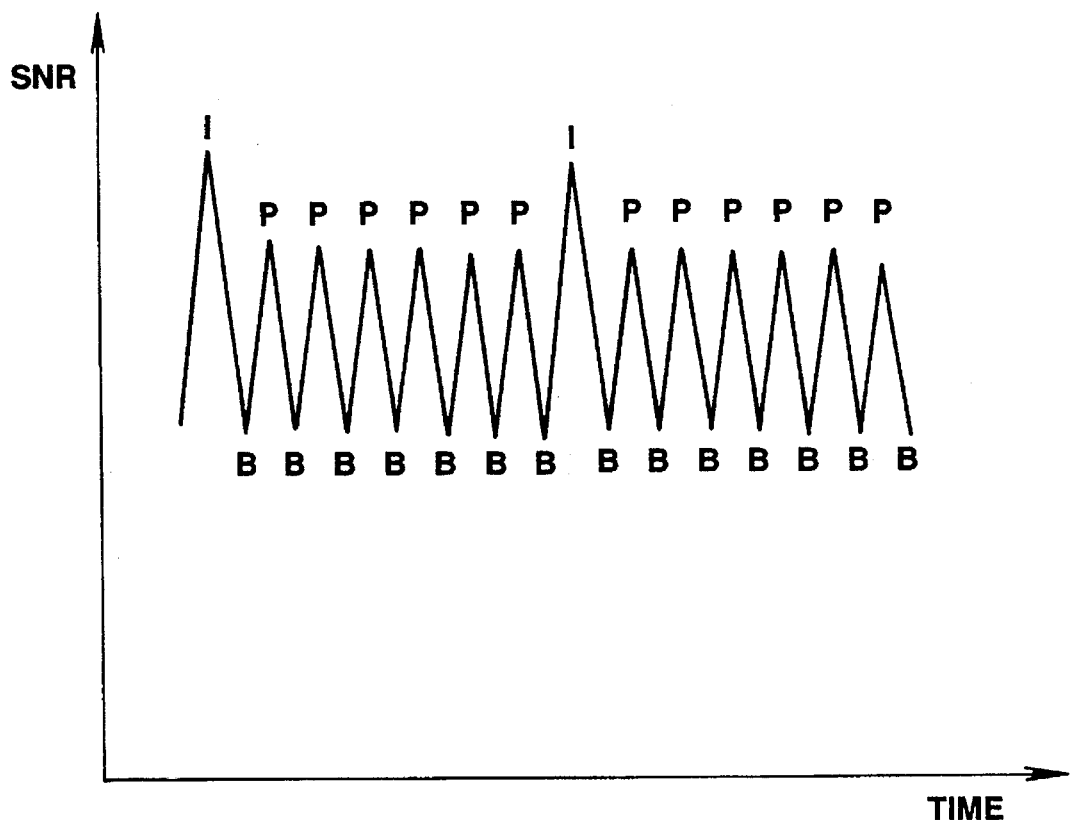
FIG. 10 is a graph showing picture quality as a function of picture type in a transmitted signal.
Figure 11:
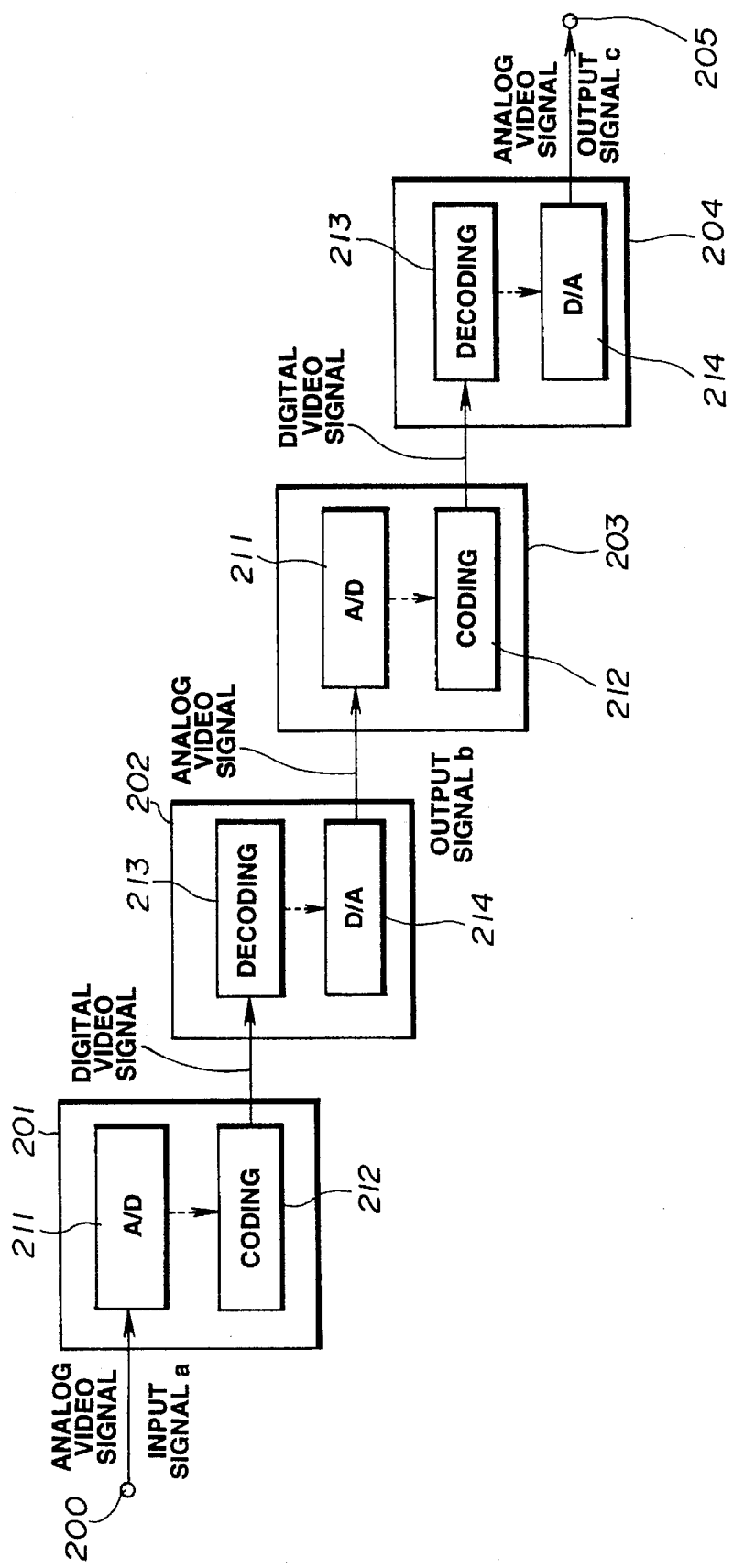
FIG. 11 is a block diagram showing two conventional video codecs connected in series using an analog connection.
Figure 12:
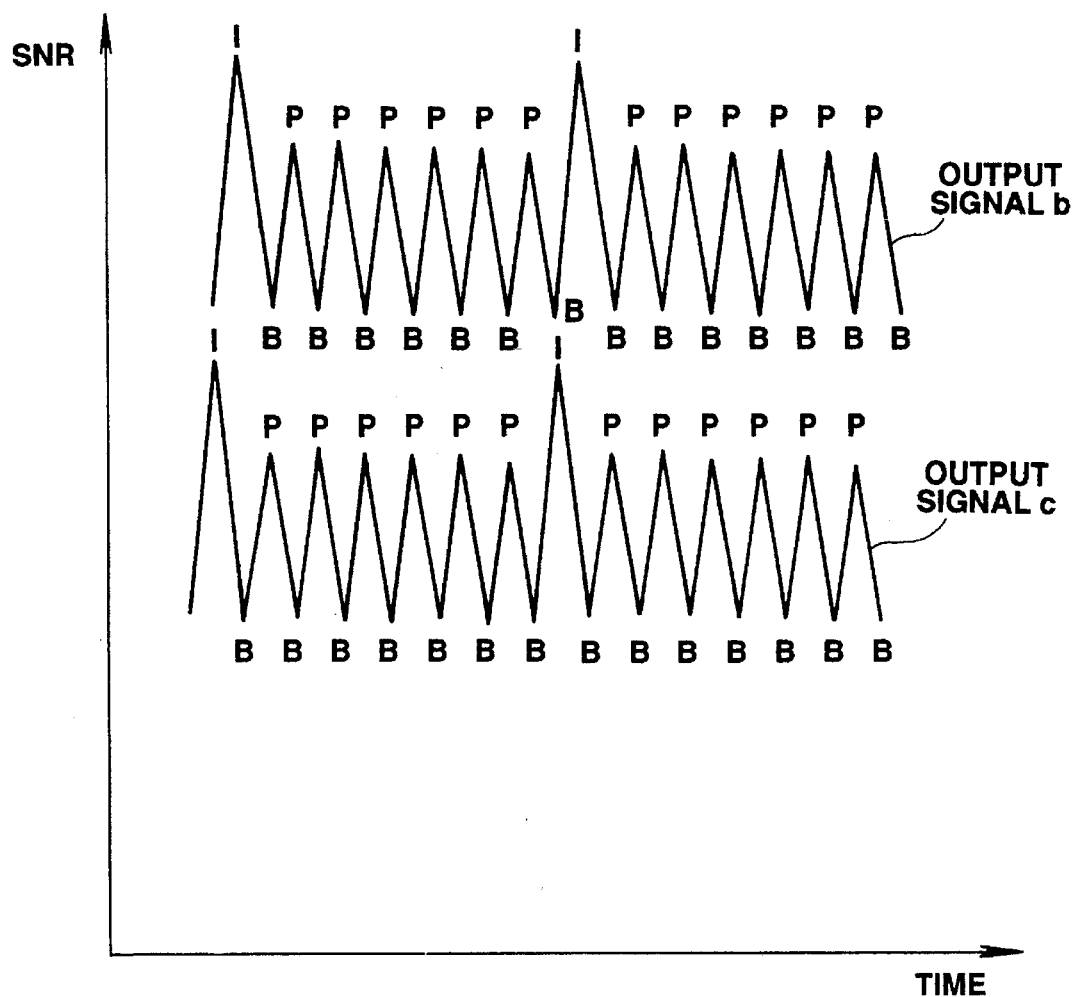
FIG. 12 is a graph showing picture quality of the signals output by the codecs of FIG. 11.
Figure 13:
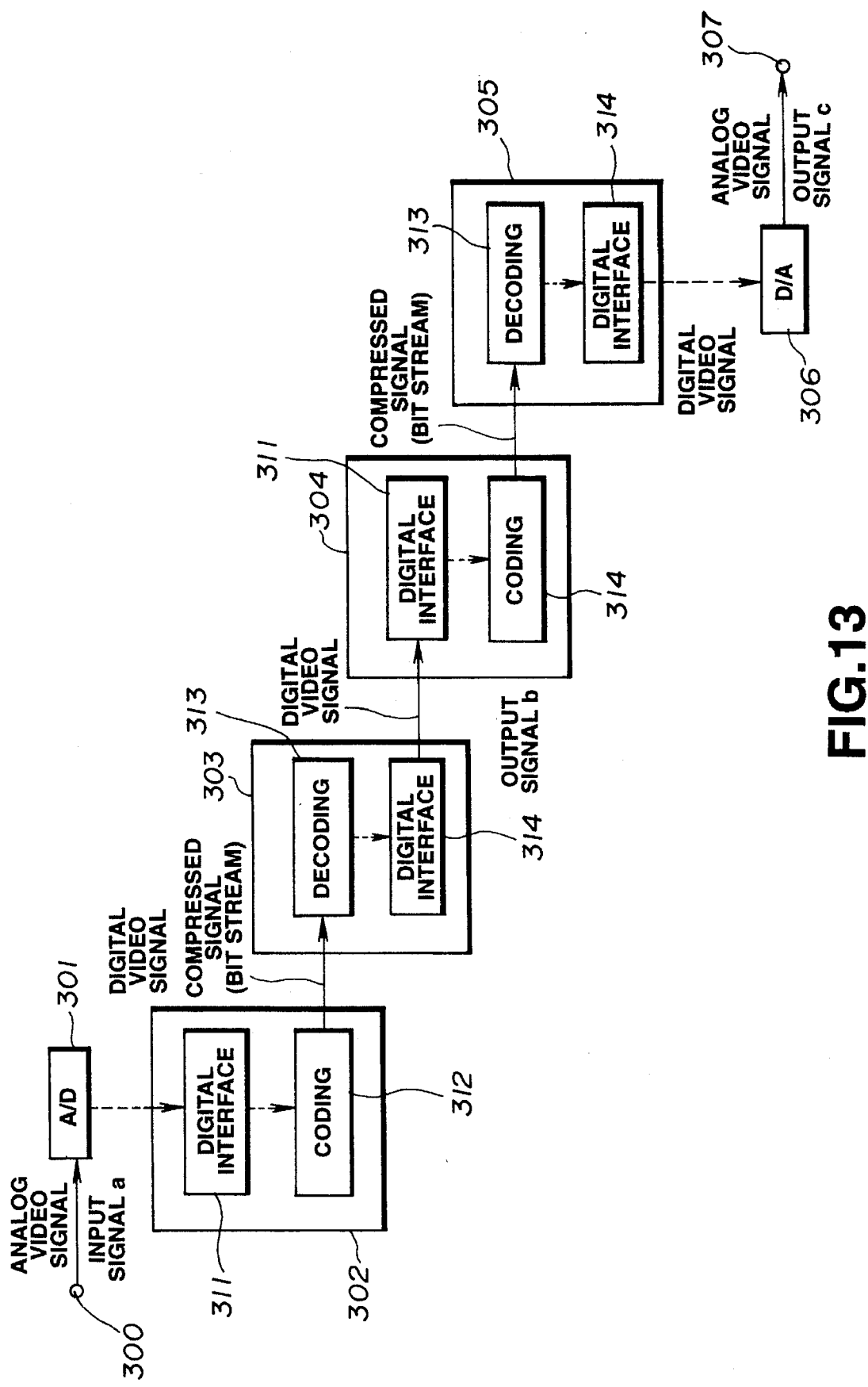
FIG. 13 is a block diagram showing two conventional video codecs connected in series using a digital connection.

Variable length decoding circuit 482 of FIG. 18 is similar to variable length decoding circuit 82 of FIG. 9, except that circuit 482 applies the picture type separated from the encoded signal not only to motion compensator 487, but also to output terminal 92.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. An apparatus for processing a picture signal that had been previously coded, comprising:

means for receiving a picture type signal included in said picture signal indicating one of intra-picture coding, predictive coding and bi-directionally predictive coding representing the previous types of coding for respective pictures represented by said picture signal; and coding means for encoding said picture signal as a function of said picture type signal to produce an encoded picture signal.

2. The apparatus of claim 1, wherein said means for receiving includes means for separating said picture type signal from said picture signal.

3. The apparatus of claim 1, further comprising means for decoding said encoded picture signal as a function of said picture type signal.

4. The apparatus of claim 1, wherein said picture signal is a digital signal.

5. The apparatus of claim 1, wherein said coding means includes motion vector detection means for detecting motion vectors between said pictures represented by said picture signal as a function of said picture type signal; predictive judging means for choosing one of intra-coding, forward predictive coding, backward predictive coding and bi-directionally predictive coding macro-block by macro-block as a function of said picture type signal; and variable length coding means for encoding said picture type signal in said encoded picture signal.

6. An apparatus for processing an encoded picture signal, comprising:

means for decoding said encoded picture signal to produce a picture type signal and a decoded picture signal, said picture type signal representing a type of encoding of said encoded picture signal; and means for multiplexing said picture type signal and said decoded picture signal to produce an output signal.

7. The apparatus of claim 6, wherein each picture of said decoded picture signal includes a vertical blanking interval; and said means for multiplexing inserts said picture type signal into the vertical blanking intervals of said decoded picture signal.

8. The apparatus of claim 6, further comprising means for encoding said decoded picture signal as a function of said picture type signal.

9. The apparatus of claim 6, wherein said decoded picture signal is a digital signal.

10. The apparatus of claim 6, wherein said means for decoding includes variable length decoding means for separating said picture type signal from said output signal and wherein said means for multiplexing is operative to multiplex the separated picture type signal.

11. A method for processing a picture signal that had been previously coded, comprising the steps of:

receiving a picture type signal included in said picture signal indicating one of intra-picture coding, predictive coding and bi-directionally predictive coding representing the previous types of coding for respective pictures represented by said picture signal; and encoding said picture signal as a function of said picture type signal to produce an encoded picture signal.

12. The method of claim 11, wherein the step of receiving includes separating said picture type signal from said picture signal.

13. The method of claim 11, further comprising a step of decoding said encoded picture signal as a function of said picture type signal.

14. The method of claim 11, wherein said picture signal is a digital signal.

15. The method of claim 11, wherein the step of encoding includes detecting motion vectors between said pictures represented by said picture signal as a function of said picture type signal; choosing one of intra-coding, forward predictive coding, backward predictive coding and bi-directionally predictive coding macro-block by macro-block as a function of said picture type signal; and encoding said picture type signal in said encoded picture signal.

16. A method for processing an encoded picture signal, comprising:

decoding said encoded picture signal to produce a picture type signal and a decoded picture signal, said picture type signal representing a type of encoding of said encoded picture signal; and multiplexing said picture type signal and said decoded picture signal to produce an output signal.

17. The method of claim 16, wherein each picture of said decoded picture signal includes a vertical blanking interval; and the step of multiplexing inserts said picture type signal into the vertical blanking intervals of said decoded picture signal.

18. The method of claim 16, further comprising a step of encoding said decoded picture signal as a function of said picture type signal.

19. The method of claim 16, wherein said decoded picture signal is a digital signal.

20. The method of claim 16, wherein the step of decoding includes separating said picture type signal from said output signal and wherein the step of multiplexing multiplexes the separated picture type signal.

\* \* \* \* \*